(12) United States Patent
Takama et al.

(10) Patent No.: US 12,544,718 B2
(45) Date of Patent: Feb. 10, 2026

(54) METHOD FOR MANUFACTURING OXYGENATOR

(71) Applicant: TERUMO KABUSHIKI KAISHA, Tokyo (JP)

(72) Inventors: Renjo Takama, Kanagawa (JP); Takeshi Sato, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 353 days.

(21) Appl. No.: 18/239,346

(22) Filed: Aug. 29, 2023

(65) Prior Publication Data

US 2023/0398495 A1 Dec. 14, 2023

Related U.S. Application Data

(63) Continuation of application No. PCT/JP2022/006838, filed on Feb. 21, 2022.

(30) Foreign Application Priority Data

Mar. 5, 2021 (JP) .................................. 2021-035129

(51) Int. Cl.
  *B01D 63/02* (2006.01)
  *B01D 71/26* (2006.01)
  *B01D 71/70* (2006.01)

(52) U.S. Cl.
  CPC ......... *B01D 63/0223* (2022.08); *B01D 71/70* (2013.01); *B01D 71/262* (2022.08)

(58) Field of Classification Search
  None
  See application file for complete search history.

(56) References Cited

U.S. PATENT DOCUMENTS 10,758,657 B2  9/2020  Anzai et al.

FOREIGN PATENT DOCUMENTS

| JP | S57180405 | 11/1982 |
| JP | S5944267 | 3/1984 |
| JP | S6397172 | 4/1988 |
| JP | 2002035116 A | 2/2002 |
| JP | 2015136383 A | 7/2015 |
| WO | 2016143751 A1 | 9/2016 |

OTHER PUBLICATIONS

International Search Opinion, PCT/JP2022/006838, Mar. 29, 2022.
International Search Report, PCT/JP2022/006838, Mar. 15, 2022.

*Primary Examiner* — Krishnan S Menon
(74) *Attorney, Agent, or Firm* — MacMillan, Sobanski & Todd, LLC

(57) ABSTRACT

A coating layer containing a silicone compound is formed on an inner surface of a hollow fiber membrane for manufacturing an oxygenator having a plurality of porous hollow fiber membranes for gas exchange. The method includes dissolving a silicone compound in an organic solvent having a surface tension of less than 70 dyn/cm to prepare a coating solution; and bringing an inner surface of the hollow fiber membranes into contact with the coating solution while bringing an outer surface of the hollow fiber membranes into contact with water to form a coating layer containing a silicone compound on the inner surface.

16 Claims, 7 Drawing Sheets

METHOD FOR MANUFACTURING OXYGENATOR

CROSS REFERENCE TO RELATED APPLICATIONS

This application is a continuation of PCT Application No. PCT/JP2022/006838, filed Feb. 21, 2022, based on and claiming priority to Japanese Application No. JP2021-035129, filed Mar. 5, 2021, both of which are incorporated herein by reference in their entirety.

BACKGROUND OF THE INVENTION

The present invention relates to a method for manufacturing an oxygenator.

An oxygenator having a porous hollow fiber membrane may have a decrease in a gas exchange performance with long-term use. Wet lung and blood plasma leakage are main factors thereof. For wet lung, it is possible to recover the gas exchange performance by blowing air at a high pressure and removing dew condensation water from the hollow fiber membrane. Meanwhile, the blood plasma leakage causes an irreversible decrease in a performance of the oxygenator. It is required to find a solution to a problem caused by the blood plasma leakage in the long-term use of the oxygenator, and many studies have been made so far.

For example, Japanese Patent Application JP2002-035116A discloses that by applying silicone coating to an outer surface of a porous hollow fiber membrane made of a polypropylene, blood plasma leakage is less likely to occur and long-term use is possible.

However, according to a method described in JP2002-035116A, the silicone coating is performed by moving a continuous line of the hollow fiber membrane at a rate of 0.5 m/min to 50 m/min in a silicone monomer gas during blood plasma discharge in a high vacuum to polymerize a silicone monomer on the outer surface of the hollow fiber membrane. Therefore, there is a problem that a coating step requires intricate equipment and long periods of time.

SUMMARY OF THE INVENTION

Therefore, an object of the invention is to provide a method for forming a coating layer containing a silicone compound on a hollow fiber membrane by a simpler method.

The present inventors have found that the above problem can be solved by dissolving the silicone compound in a specific organic solvent to prepare a coating solution, and bringing the coating solution into contact with an inner surface of the hollow fiber membrane while bringing an outer surface of the hollow fiber membrane into contact with water.

That is, the above object is achieved by a method for manufacturing an oxygenator having a plurality of porous hollow fiber membranes for gas exchange, the method including: dissolving a silicone compound in an organic solvent having a surface tension of less than 70 dyn/cm to prepare a coating solution; and bringing an inner surface of the hollow fiber membranes into contact with the coating solution while bringing an outer surface of the hollow fiber membranes into contact with water to form a coating layer containing a silicone compound on the inner surface.

DETAILED DESCRIPTION OF PREFERRED EMBODIMENTS

Figure 1:
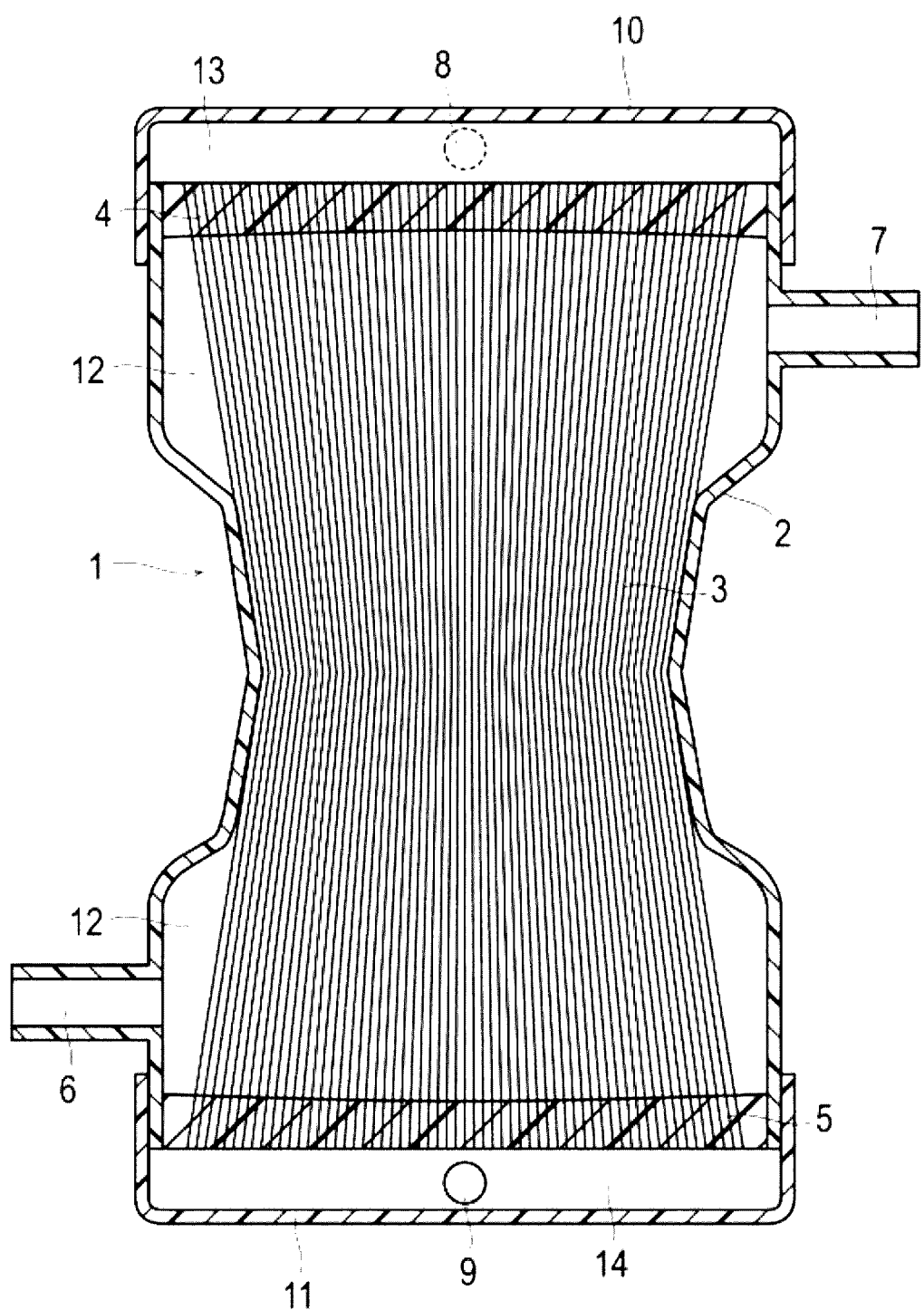
FIG. 1 is a cross-sectional view of a hollow fiber membrane external perfusion type oxygenator according to an embodiment of the invention.

The invention relates to a method for manufacturing an oxygenator having a plurality of porous hollow fiber membranes for gas exchange, the method including dissolving a silicone compound in an organic solvent having a surface tension of less than 70 dyn/cm to prepare a coating solution, and bringing an inner surface of the hollow fiber membranes into contact with the coating solution while bringing an outer surface of the hollow fiber membranes into contact with water to form a coating layer containing a silicone compound (a silicone compound used for preparing the coating solution and/or a crosslinked product of the silicone compound) on the inner surface.

According to the method for manufacturing an oxygenator in the invention, compared with a manufacturing method described in JP2002-035116A, the coating layer containing the silicone compound can be formed on the hollow fiber membranes by a simpler method.

According to the method in the invention, the coating solution can easily pass through a lumen of the hollow fiber membranes by using the organic solvent having a surface tension of less than 70 dyn/cm. On the other hand, according to studies of the present inventors, it is found that as the surface tension of the organic solvent reduces or as a time of bringing the inner surface of the hollow fiber membranes into contact with the coating solution increases, the coating solution easily leaks to the outer surface of the hollow fiber membranes through pores in the hollow fiber membranes. When the coating solution leaks to the outer surface of the hollow fiber membranes, the silicone compound is exposed on the outer surface of the hollow fiber membranes (a coat containing the silicone compound is formed on a part of the outer surface), and a coat containing an antithrombotic polymer compound (particularly, a water-soluble antithrombotic polymer compound (for example, polymethoxyethyl acrylate (PMEA))) is not formed (or hardly formed) on the outer surface. Therefore, the present inventors have found that, by bringing the inner surface of the hollow fiber membranes into contact with the coating solution while bringing the outer surface of the hollow fiber membranes into contact with water, the coating solution is less likely to leak to the outer surface of the hollow fiber membranes through the pores in the hollow fiber membranes due to a water pressure from the outer surface, and the silicone compound can be prevented from being exposed on the outer surface. As a result, the present inventors have found that an oxygenator having desired blood plasma leakage resistance and antithrombotic property can be provided, and have completed the invention.

Hereinafter, preferred embodiments of the invention will be described. The invention is not limited to the following embodiments, and various modifications can be made within a scope of the claims. Throughout the entire specification, a singular expression should be understood as encompassing a concept thereof in a plural form unless otherwise specified. Therefore, a singular article (for example, "a", "an", and "the" in English) also should be understood as encompassing a concept thereof in a plural form unless otherwise specified. Terms used in the present specification should be understood to be used in a meaning generally used in the field unless otherwise specified. Therefore, unless otherwise specified, all technical terms and scientific technical terms used in the present specification have meanings same as those generally understood by a person skilled in the art in the field to which the invention belongs. If there is a conflict, the present specification (including definitions) takes precedence. Dimensional ratios in the drawings are exaggerated for convenience of description and may differ from actual ratios.

In the present specification, "X to Y" indicating a range includes X and Y, and means "X or more and Y or less". Unless otherwise specified, an operation and measurement for physical properties and the like are performed under a condition of room temperature (20° C. to 25° C.) and a relative humidity of 40% to 50% RH. "A and/or B" means both A and B, or either A or B.

Hereinafter, the method for manufacturing an oxygenator according to the invention will be described in detail, and in the present specification, for convenience, an oxygenator that can be obtained by the manufacturing method according to the invention will be first described, and then the manufacturing method according to the invention will be described. Description of the oxygenator and description of the method for manufacturing an oxygenator are mutually applicable.

Details of the oxygenator according to the invention will be described below with reference to the drawings.

Figure 2:
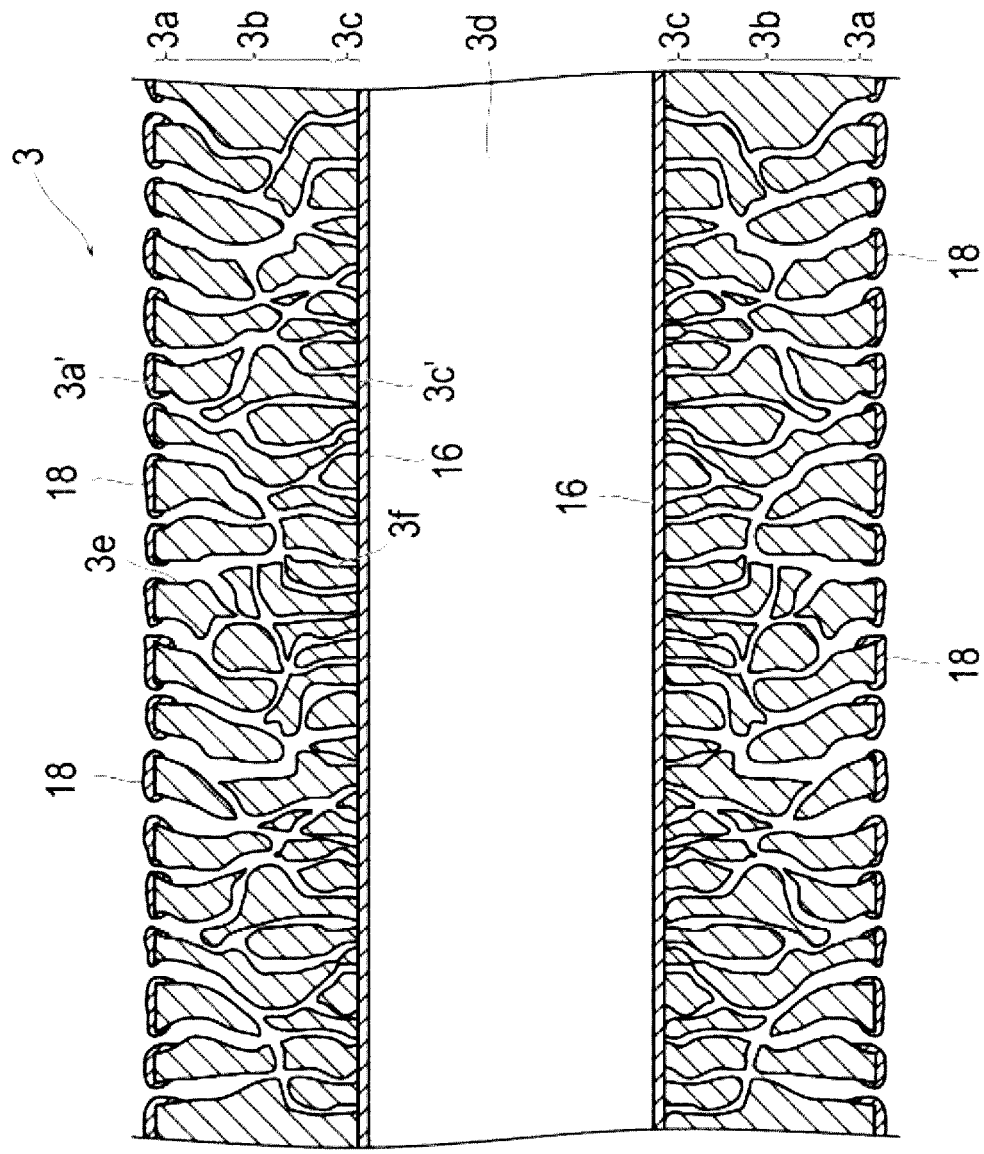
FIG. 2 is an enlarged cross-sectional view of the porous hollow fiber membrane for gas exchange used in the hollow fiber membrane external perfusion type oxygenator according to the embodiment of the invention.

FIG. 1 is a cross-sectional view of a hollow fiber membrane external perfusion type oxygenator according to an embodiment of the invention. In FIG. 1, reference numeral 1 denotes the hollow fiber membrane external perfusion type oxygenator, reference numeral 2 denotes a housing, reference numeral 3 denotes a porous hollow fiber membrane for gas exchange, reference numerals 4 and 5 denote partition walls, reference numeral 6 denotes a blood inflow port, reference numeral 7 denotes a blood outflow port, reference numeral 8 denotes a gas inflow port, reference numeral 9 denotes a gas outflow port, reference numeral 10 denotes a gas-inflow-side header, reference numeral 11 denotes a gas-outflow-side header, reference numeral 12 denotes a blood chamber, reference numeral 13 denotes a gas inflow chamber, and reference numeral 14 denotes a gas outflow chamber. FIG. 2 is an enlarged cross-sectional view of the porous hollow fiber membrane for gas exchange used in the hollow fiber membrane external perfusion type oxygenator according to the embodiment of the invention. In FIG. 2, reference numeral 3 denotes a porous hollow fiber membrane for gas exchange, reference numeral 3*a* denotes an outer layer, reference numeral 3*a'* denotes an outer surface, reference numeral 3*b* denotes a middle layer, reference numeral 3*c* denotes an inner layer, reference numeral 3*c'* denotes an inner surface, reference numeral 3*d* denotes a passage (lumen), reference numeral 3*e* denotes an opening on an outer surface side, reference numeral 3*f* denotes an opening on an inner surface side, reference numeral 16 denotes coating layers, and reference numeral 18 denotes coats. In the present specification, the hollow fiber membrane external perfusion type oxygenator is also simply referred to as a "hollow fiber membrane type oxygenator" or an "oxygenator". In the present specification, the porous hollow fiber membrane for gas exchange is also simply referred to as a "porous hollow fiber membrane" or a "hollow fiber membrane".

In the embodiment shown in FIG. 1, in a hollow fiber membrane external perfusion type oxygenator 1, a large number of porous hollow fiber membranes for gas exchange 3 are housed in a housing 2. As shown in FIG. 2, the hollow fiber membranes 3 each include a passage (lumen) 3*d* in which a gas chamber is formed at a center. In addition, the hollow fiber membranes 3 each have openings 3*e* and 3*f* through which an outer surface 3*a'* communicates with an inner surface 3*c'*. A coating layer 16 containing a silicone compound is formed on the inner surface 3*c'* of the hollow fiber membranes 3 through which an oxygen-containing gas flows. A coat 18 containing an antithrombotic polymer compound is formed on the outer surface 3*a'* (in some cases, the outer surface 3*a'* and an outer layer 3*a*) of the hollow fiber membranes 3 serving as a blood contact portion. The coating layer 16 may contain other components in addition to the silicone compound. Here, the other components are not particularly limited, and examples thereof include polyolefins, aliphatic hydrocarbons, inorganic fine particles, and crosslinkers. Preferably, the coating layer 16 is made of only the silicone compound. Similarly, the coat 18 may contain other components in addition to the antithrombotic polymer compound. Here, the other components are not particularly limited, and examples thereof include other antithrombotic compounds (for example, heparin), crosslinkers, thickeners, preservatives, and pH adjusters.

The coating layer 16 containing the silicone compound may be formed on at least a part of the inner surface 3*c'* of the hollow fiber membranes 3 through which the oxygen-containing gas flows, and is preferably formed on the entire inner surface 3*c'* from a viewpoint of maintaining a gas exchange performance in long-term use (a blood plasma leakage resistance improving effect and a wet lung reducing effect) or the like. In the embodiment shown in FIG. 2, the coating layer 16 containing the silicone compound is formed to close the openings 3*f* of pores on an inner surface 3*c'* side over the entire inner surface 3*c'*, but has high gas permeability, and can thus have a sufficient gas exchange performance. In addition, the coating layer 16 containing the silicone compound may be present in an inner layer 3*c* (in some cases, the inner layer 3*c* and a middle layer 3*b*) of the hollow fiber membranes 3.

Similarly, the coat 18 containing the antithrombotic polymer compound may be formed on at least a part of the outer surface 3*a'* of the hollow fiber membranes 3 serving as the blood contact portion, and is preferably formed on the entire outer surface 3*a'* from a viewpoint of the antithrombotic property, biocompatibility (a platelet adhesion/attachment reducing and prevention effect and a platelet activation reducing and prevention effect) or the like. In the embodiment shown in FIG. 2, the coat 18 containing the antithrombotic polymer compound may be present in the middle layer 3*b* (in some cases, the middle layer 3*b* and the inner layer 3*c*) of the hollow fiber membranes 3, and is preferably substantially absent in the middle layer 3*b* (in some cases, the middle layer 3*b* and the inner layer 3*c*) of the hollow fiber membranes 3. Since the antithrombotic polymer compound is substantially absent, the middle layer 3*b* or the inner layer 3c of the hollow fiber membrane 3 maintains a hydrophobic property of a base material of the membrane, which can effectively prevent leakage of a blood plasma component. In the present specification, the expression "the coat 18 containing the antithrombotic polymer compound is substantially absent in the middle layer 3b (in some cases, the middle layer 3b and the inner layer 3c) of the hollow fiber membranes 3" means that permeation of the antithrombotic polymer compound is not observed around the inner surface 3c' of the hollow fiber membranes 3 (a surface on a side where the oxygen-containing gas flows). As will be described later in a preferred embodiment of the method for manufacturing an oxygenator, a coat is formed by application of a colloid solution containing an antithrombotic polymer compound, whereby the antithrombotic polymer compound can be substantially absent in the middle layer 3b or the inner layer 3c of the hollow fiber membranes 3.

The hollow fiber membrane type oxygenator 1 according to the present embodiment includes the housing 2 having a blood inflow port 6 and a blood outflow port 7, a hollow fiber membrane bundle including a large number of porous hollow fiber membranes for gas exchange 3 housed in the housing 2, a pair of partition walls 4 and 5 that support both end portions of the hollow fiber membrane bundle in the housing 2 in a liquid-tight manner, a blood chamber 12 formed between the partition walls 4 and 5, an inner surface of the housing 2 and an outer surface of the hollow fiber membranes 3, a gas chamber formed inside the hollow fiber membranes 3, and a gas inflow port 8 and a gas outflow port 9 that communicate with the gas chamber.

Specifically, the hollow fiber membrane type oxygenator 1 according to the present embodiment includes the tubular housing 2, an aggregate of the hollow fiber membranes for gas exchange 3 housed in the tubular housing 2, and the partition walls 4 and 5 that support both end portions of the hollow fiber membranes 3 in the housing 2 in a liquid-tight manner. An interior of the tubular housing 2 is partitioned into the blood chamber 12 as a first fluid chamber and the gas chamber as a second fluid chamber, and the tubular housing 2 is provided with the blood inflow port 6 and the blood outflow port 7 which communicate with the blood chamber 12.

A cap-shaped gas-inflow-side header 10 having the gas inflow port 8 as a second fluid inflow port communicating with the gas chamber, which is an internal space of the hollow fiber membranes 3, is attached above the partition wall 4 which is an end portion of the tubular housing 2. Accordingly, a gas inflow chamber 13 is formed by an outer surface of the partition wall 4 and an inner surface of the gas-inflow-side header 10. The gas inflow chamber 13 communicates with the gas chamber formed in an internal space of the hollow fiber membranes 3.

Similarly, a cap-shaped gas-outflow-side header 11 having the gas outflow port 9 as a second fluid outflow port communicating with the internal space of the hollow fiber membranes 3 is attached below the partition wall 5. Accordingly, a gas outflow chamber 14 is formed by an outer surface of the partition wall 5 and an inner surface of the gas-outflow-side header 11.

The hollow fiber membrane 3 is a porous membrane made of a hydrophobic polymer material, is a hollow fiber membrane same as that used in a known oxygenator, and is not particularly limited. In this way, when the hollow fiber membrane (in particular, the inner surface of the hollow fiber membrane) is made of a hydrophobic polymer material, leakage of the blood plasma component can be reduced. As a material used for the porous membrane, a hydrophobic polymer material same as that of the hollow fiber membrane used for the known oxygenator can be used. Specifically, examples of the material include a polyolefin resin such as a polypropylene, a polyethylene, and polymethylpentene, and a polymer material such as polysulfone, polyacrylonitrile, polytetrafluoroethylene, and cellulose acetate. Among these, a polyolefin resin is preferably used, a polypropylene and polymethylpentene are more preferable, and a polypropylene is still more preferable. That is, in a preferred embodiment of the invention, at least a part of the hollow fiber membranes (preferably all the hollow fiber membranes) are formed of a polyolefin resin. In a more preferred embodiment of the invention, at least a part of the hollow fiber membranes (preferably all the hollow fiber membranes) are formed of a polypropylene or polymethylpentene. In a still more preferred embodiment of the invention, at least a part of the hollow fiber membranes (preferably all the hollow fiber membranes) are formed of a polypropylene.

An inner diameter of the hollow fiber membrane is not particularly limited, and is preferably 50 µm to 300 µm, and more preferably 80 µm to 200 µm. An outer diameter of the hollow fiber membrane is not particularly limited, and is preferably 100 µm to 400 µm, and more preferably 130 µm to 200 µm. A thickness (membrane thickness) of the hollow fiber membrane is preferably 20 µm or more and less than 50 µm, more preferably 25 µm or more and less than 50 µm, still more preferably 25 µm to 45 µm, even more preferably 25 µm to 40 µm, even still more preferably 25 µm to 35 µm, and particularly preferably 25 µm to 30 µm. In the present specification, the "thickness (membrane thickness) of the hollow fiber membrane" means a thickness between the Inner surface and the outer surface of the hollow fiber membrane, and is expressed by a formula: [(outer diameter of hollow fiber membrane)−(inner diameter of hollow fiber membrane)]/2. By setting a lower limit of the thickness of the hollow fiber membrane as described above, a strength of the hollow fiber membrane can be sufficiently ensured. Further, it is also satisfactory in terms of a trouble and a cost in manufacturing, which is also preferable from a viewpoint of mass production. A porosity of the hollow fiber membrane is preferably 5 vol % to 90 vol %, more preferably 10 vol % to 80 vol %, and particularly preferably 30 vol % to 60 vol %. A pore diameter of the hollow fiber membrane is preferably 0.01 µm to 5 µm, and more preferably 0.05 µm to 1 µm. A method for manufacturing the hollow fiber membrane is not particularly limited and may be similar to a known method for manufacturing a hollow fiber membrane or the known method that is suitably modified. For example, the hollow fiber membrane is preferably obtained by forming micropores in a wall by a stretching method or a solid-liquid phase separation method.

In the present specification, the "pore diameter of the hollow fiber membrane" refers to an average diameter of openings on a side covered with the antithrombotic polymer compound (outer surface side). The pore diameter of the hollow fiber membrane can be measured by the following method.

First, a side (outer surface) of the hollow fiber membrane covered with the antithrombotic polymer compound is imaged with a scanning electron microscope (SEM). Next, an obtained SEM image is subjected to image processing to reassign pores (openings) for white and the other portions for black, and the number of pixels of the white portion is measured. A binarization boundary level is set to an intermediate value of a difference between the whitest portion and the blackest portion.

Subsequently, the number of pixels of the pores (openings) displayed in white is counted. A pore area is calculated based on the number of the pixels of each pore obtained in this manner and a degree of image resolution (μm/pixel) of the SEM image. Based on the obtained pore area, a diameter of each pore is calculated assuming that the pore is circular, a statistically significant number, for example, diameters of 500 pores are randomly extracted, and an arithmetic average diameter of the pores is referred to as the "pore diameter of the hollow fiber membrane".

The tubular housing 2 can be made of a material same as that used for a housing of the known oxygenator. Specifically, examples of the material include a hydrophobic synthetic resin such as a polycarbonate, an acryl-styrene copolymer, and an acryl-butylene-styrene copolymer. The housing 2 is not particularly limited in shape and has, for example, a cylindrical shape, and is preferably a transparent body. Forming a transparent body makes it possible to easily check the inside of the housing.

The quantity of the hollow fiber membranes housed in the present embodiment is not particularly limited and may be similar to that in the known oxygenator. For example, about 5,000 to 100,000 porous hollow fiber membranes 3 are housed in the housing 2 in parallel in an axial direction. Further, the hollow fiber membranes 3 are fixed to both ends of the housing 2 in a liquid-tight state by the partition walls 4 and 5 in a state in which both ends of the hollow fiber membranes 3 are open. The partition walls 4 and 5 are formed of a potting agent such as a polyurethane and a silicone rubber. A portion sandwiched between the partition walls 4 and 5 in the housing 2 is divided into the gas chamber inside the hollow fiber membranes 3 and the blood chamber 12 outside the hollow fiber membranes 3.

In the present embodiment, the gas-inflow-side header 10 having the gas inflow port 8 and the gas-outflow-side header 11 having the gas outflow port 9 are attached to the housing 2 in a liquid-tight manner. These headers may be formed of any material, and may be formed of, for example, the hydrophobic synthetic resin used for the housing. The headers may be attached by any method, and for example, the headers are attached to the housing 2 by fusion using an ultrasound, a high frequency, induction heating, or the like, by adhesion using an adhesive, or by mechanical fitting. Alternatively, a fastening ring (not shown) may be used. It is preferable that the entire blood contact portion (the inner surface of the housing 2 and the outer surface of the hollow fiber membranes 3) of the hollow fiber membrane type oxygenator 1 is formed of a hydrophobic material.

In the present embodiment, a cover (coat) of the antithrombotic polymer compound is selectively formed on the outer surface of the hollow fiber membrane (of external perfusion type). Therefore, blood (in particular, a blood plasma component) does not easily permeate the pores in the hollow fiber membrane, or does not permeate the pores. Hence, the leakage of the blood (in particular, the blood plasma component) from the hollow fiber membrane can be effectively reduced or prevented. In particular, when the antithrombotic polymer compound is not substantially present in the middle layer 3b of the hollow fiber membrane 3 and the inner layer 3c of the hollow fiber membrane 3, the middle layer 3b of the hollow fiber membrane 3 and the inner layer 3c of the hollow fiber membrane 3 maintain a hydrophobic state of a material, and thus severe leakage of blood (in particular, the blood plasma component) can be more effectively reduced or prevented. Therefore, the oxygenator obtained by the method according to the invention can maintain a high gas exchange performance over a long time.

The cover of the antithrombotic polymer compound according to the present embodiment is essentially formed on the outer surface of the hollow fiber membrane of the oxygenator, or may be formed on other components (for example, the entire blood contact portion) in addition to the outer surface. With this configuration, it is possible to more effectively reduce or prevent platelet adhesion/attachment and activation in the entire blood contact portion of the oxygenator. Since a contact angle of a blood contact surface is reduced, a priming operation is facilitated. In this case, it is preferable that the cover of the antithrombotic polymer compound according to the invention is formed on the other components with which blood comes into contact, but the antithrombotic polymer compound may not be covered on the hollow fiber membrane other than the blood contact portion or other portions (for example, portions buried in the partition walls) of the hollow fiber membrane. Such portions do not come into contact with blood, and thus do not cause any particular problem even if not covered with the antithrombotic polymer compound.

Figure 3:
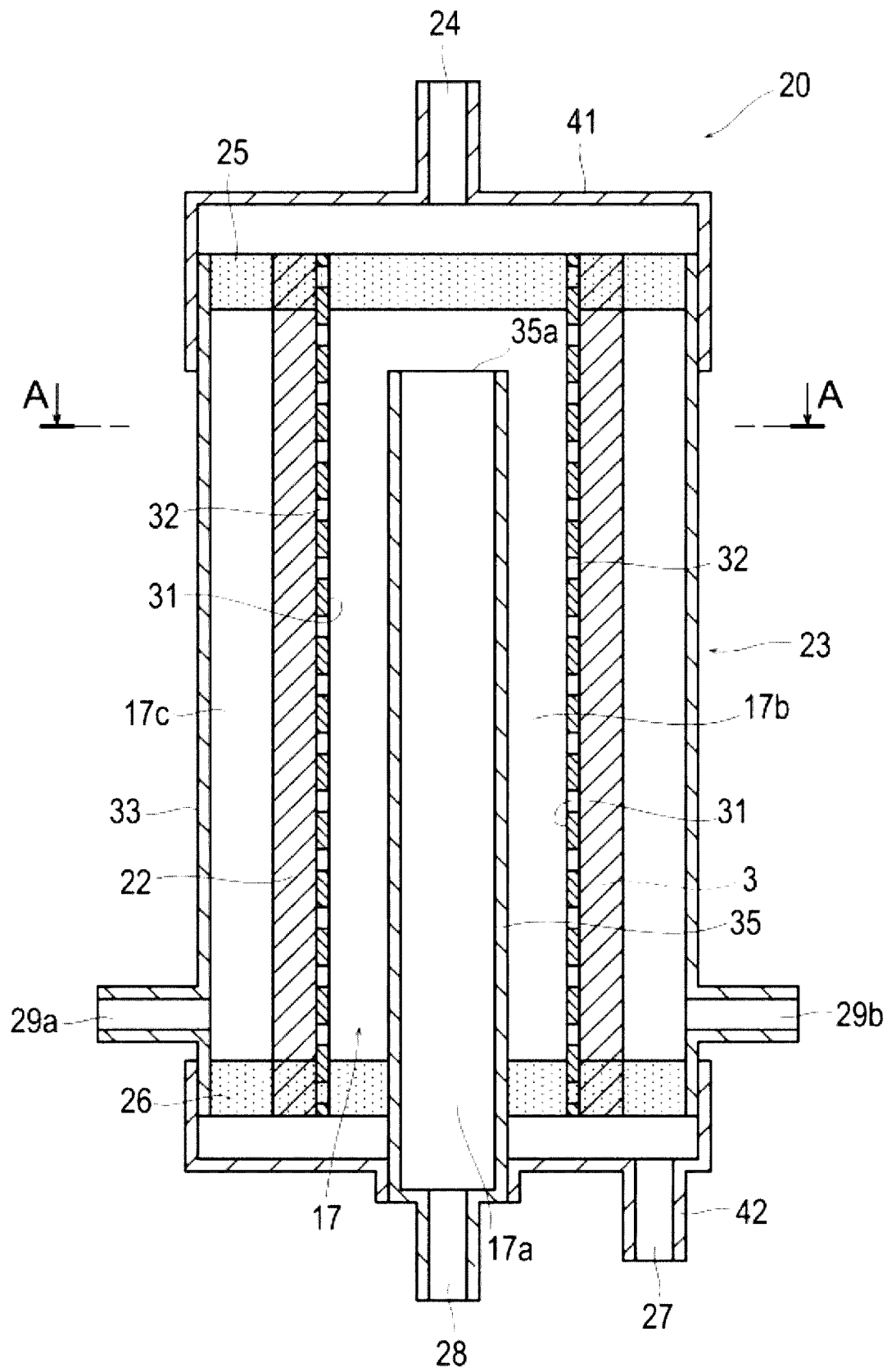
FIG. 3 is a cross-sectional view of a hollow fiber membrane external perfusion type oxygenator according to another embodiment of the invention.
Figure 4:
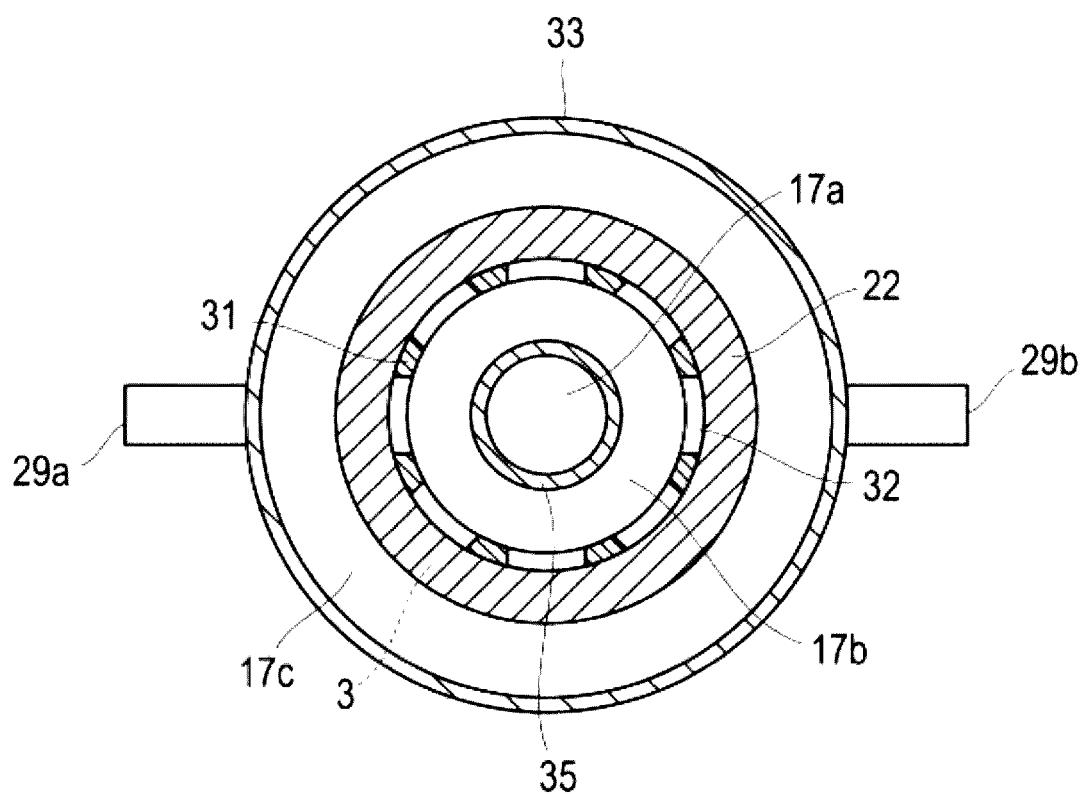
FIG. 4 is a cross-sectional view taken along a line A-A in FIG. 3.

The oxygenator obtained by the method according to the invention may be of a type shown in FIG. 3. FIG. 3 is a cross-sectional view showing another embodiment of the oxygenator obtained by the method according to the invention. In FIG. 3, reference numeral 20 denotes the hollow fiber membrane external perfusion type oxygenator, reference numeral 3 denotes the porous hollow fiber membrane for gas exchange, reference numeral 17 denotes a blood chamber, reference numerals 17a and 28 denote blood inflow ports, reference numeral 17b denotes a first blood chamber, reference numeral 17c denotes a second blood chamber, reference numeral 22 denotes a tubular hollow fiber membrane bundle, reference numeral 23 denotes a housing, reference numeral 24 denotes a gas inflow port, reference numeral 25 denotes a first partition wall, reference numeral 26 denotes a second partition wall, reference numeral 27 denotes a gas outflow port, reference numerals 29a and 29b denote blood outflow ports, reference numeral 31 denotes an inner tubular member, reference numeral 32 denotes a blood flow opening, reference numeral 33 denotes an outer tubular member, reference numeral 35 denotes an inner tubular body, reference numeral 41 denotes a gas inflow member, and reference numeral 42 denotes a gas outflow member. FIG. 4 is a cross-sectional view taken along a line A-A in FIG. 3. In FIG. 4, reference numeral 3 denotes the porous hollow fiber membrane for gas exchange, reference numeral 17a denotes the blood inflow port, reference numeral 17b denotes the first blood chamber, reference numeral 17c denotes the second blood chamber, reference numeral 22 denotes the tubular hollow fiber membrane bundle, reference numerals 29a and 29b denote the blood outflow ports, reference numeral 31 denotes the inner tubular member, reference numeral 32 denotes the blood flow opening, reference numeral 33 denotes the outer tubular member, and reference numeral 35 denotes the inner tubular body.

In FIG. 3, an oxygenator (hollow fiber membrane external perfusion type oxygenator) 20 includes an inner tubular member 31 having blood flow openings 32 on a side surface thereof, a tubular hollow fiber membrane bundle 22 including a large number of porous hollow fiber membranes for gas exchange 3 wound around an outer surface of the inner tubular member 31, a housing 23 that houses the tubular hollow fiber membrane bundle 22 together with the inner tubular member 31, partition walls 25 and 26 that fix both end portions of the tubular hollow fiber membrane bundle 22 to the housing 23 in a state in which both end portions of the hollow fiber membranes 3 are open, a blood inflow port 28 and blood outflow ports 29a and 29b that communicate with a blood chamber 17 formed in the housing 23, and a gas inflow port 24 and a gas outflow port 27 that communicate with inside of the hollow fiber membranes 3.

As shown in FIGS. 3 and 4, in the oxygenator 20 according to the present embodiment, the housing 23 includes an outer tubular member 33 in which the inner tubular member 31 is housed, the tubular hollow fiber membrane bundle 22 is housed between the inner tubular member 31 and the outer tubular member 33, and the housing 23 further includes one of a blood inflow port and a blood outflow port communicating with inside of the inner tubular member 31, and the other of a blood inflow port and a blood outflow port communicating with inside of the outer tubular member 33.

Specifically, in the oxygenator 20 according to the present embodiment, the housing 23 includes an inner tubular body 35 that is housed in the outer tubular member 33 and the inner tubular member 31 and that has a distal end opening in the inner tubular member 31. The blood inflow port 28 is formed at one end (lower end) of the inner tubular body 35, and the two blood outflow ports 29a and 29b extending outward are formed on a side surface of the outer tubular member 33. The number of the blood outflow ports may be one or more.

The tubular hollow fiber membrane bundle 22 is wound around the outer surface of the inner tubular member 31. That is, the inner tubular member 31 serves as a core of the tubular hollow fiber membrane bundle 22. The inner tubular body 35 housed inside the inner tubular member 31 has a distal end portion open near the first partition wall 25. The blood inflow port 28 is formed at a lower end portion protruding from the inner tubular member 31.

The inner tubular body 35, the inner tubular member 31 around which the hollow fiber membrane bundle 22 is wound, and the outer tubular member 33 are substantially concentrically disposed. Due to the first partition wall 25, one end (upper end) of the inner tubular member 31 around which the hollow fiber membrane bundle 22 is wound and one end (upper end) of the outer tubular member 33 maintain a concentric positional relation therebetween and are in a liquid-tight state in which the inside of the inner tubular member 31 and a space formed between the outer tubular member 33 and the outer surface of the hollow fiber membranes 3 do not communicate with the outside.

Due to the second partition wall 26, portions of the inner tubular body 35 slightly above the blood inflow port 28, that is, the other end (lower end) of the inner tubular member 31 around which the hollow fiber membrane bundle 22 is wound and the other end (lower end) of the outer tubular member 33, maintain a concentric positional relation therebetween and are in a liquid-tight state in which a space formed between the inner tubular body 35 and the inner tubular member 31 and a space formed between the outer tubular member 33 and the outer surface of the hollow fiber membranes 3 do not communicate with the outside. The partition walls 25 and 26 are formed of a potting agent such as a polyurethane and a silicone rubber.

The oxygenator 20 according to the present embodiment includes a blood inflow port 17a formed inside the inner tubular body 35, a first blood chamber 17b formed between the inner tubular body 35 and the inner tubular member 31 and having a substantially tubular space, and a second blood chamber 17c formed between the hollow fiber membrane bundle 22 and the outer tubular member 33 and having a substantially tubular space, and the blood chamber 17 is formed by these components.

Blood that has flowed in from the blood inflow port 28 flows into the blood inflow port 17a, rises in the inner tubular body 35 (blood inflow port 17a), flows out from an upper end 35a (opening end) of the inner tubular body 35, flows into the first blood chamber 17b, passes through the openings 32 formed in the inner tubular member 31, comes into contact with the hollow fiber membranes 3, performs gas exchange, flows into the second blood chamber 17c, and flows out from the blood outflow ports 29a and 29b.

A gas inflow member 41 having the gas inflow port 24 is fixed to one end of the outer tubular member 33, and similarly, a gas outflow member 42 having the gas outflow port 27 is fixed to the other end of the outer tubular member 33. The blood inflow port 28 of the inner tubular body 35 protrudes outward through the gas outflow member 42.

The outer tubular member 33 is not particularly limited, and may be, for example, a cylindrical body, a polygonal tubular member, or a member having an elliptical cross-section. A cylindrical body is preferable. An inner diameter of the outer tubular member 33 is not particularly limited, may be the same as an inner diameter of an outer tubular member used in the known oxygenator, and is preferably about 32 mm to 164 mm. An effective length of the outer tubular member 33 (among the entire length, a length of a portion that is not buried in the partition walls) is also not particularly limited, may be the same as an effective length of the outer tubular member used in the known oxygenator, and is preferably about 10 mm to 730 mm.

The inner tubular member 31 is not particularly limited in shape and may be, for example, a cylindrical body, a polygonal tubular member, or a member having an elliptical cross-section. A cylindrical body is preferable. An outer diameter of the inner tubular member 31 is not particularly limited, may be the same as an outer diameter of an inner tubular member used in the known oxygenator, and is preferably about 20 mm to 100 mm. An effective length of the inner tubular member 31 (among the entire length, a length of a portion that is not buried in the partition walls) is also not particularly limited, may be the same as an effective length of the inner tubular member used in the known oxygenator, and is preferably about 10 mm to 730 mm.

Figure 5:
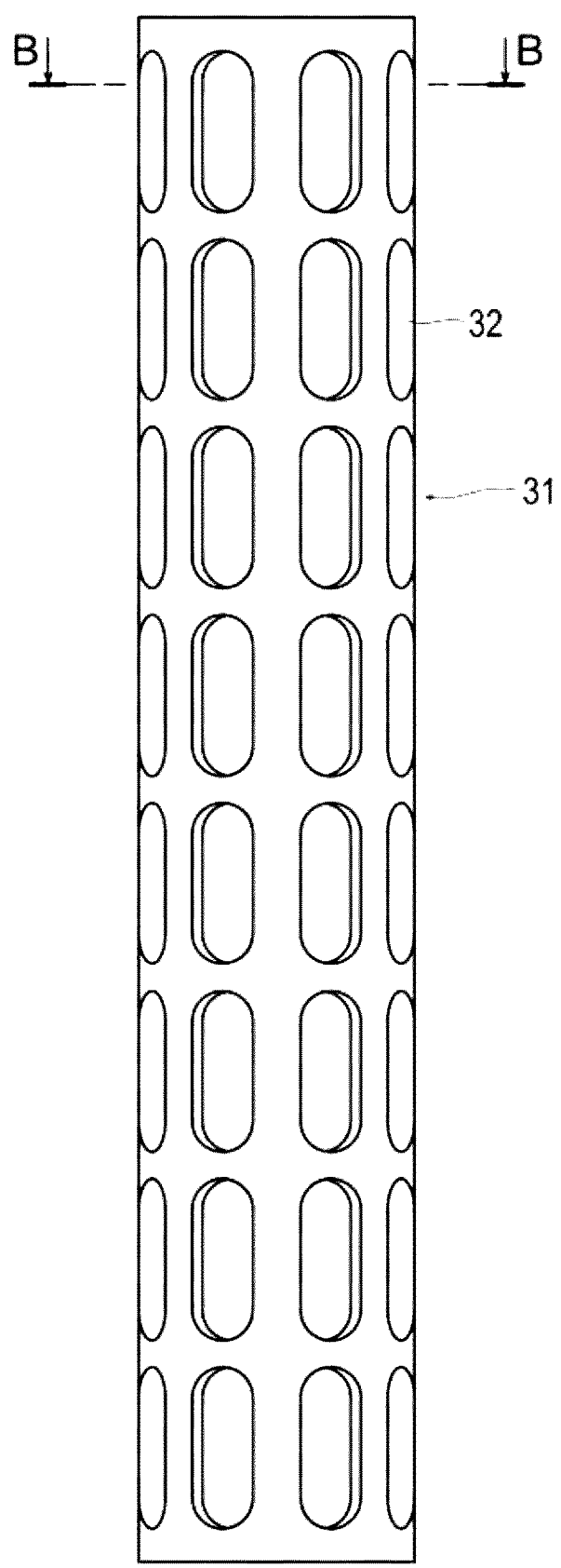
FIG. 5 is a front view showing an example of the inner tubular member used in the hollow fiber membrane external perfusion type oxygenator according to the invention.
Figure 6:
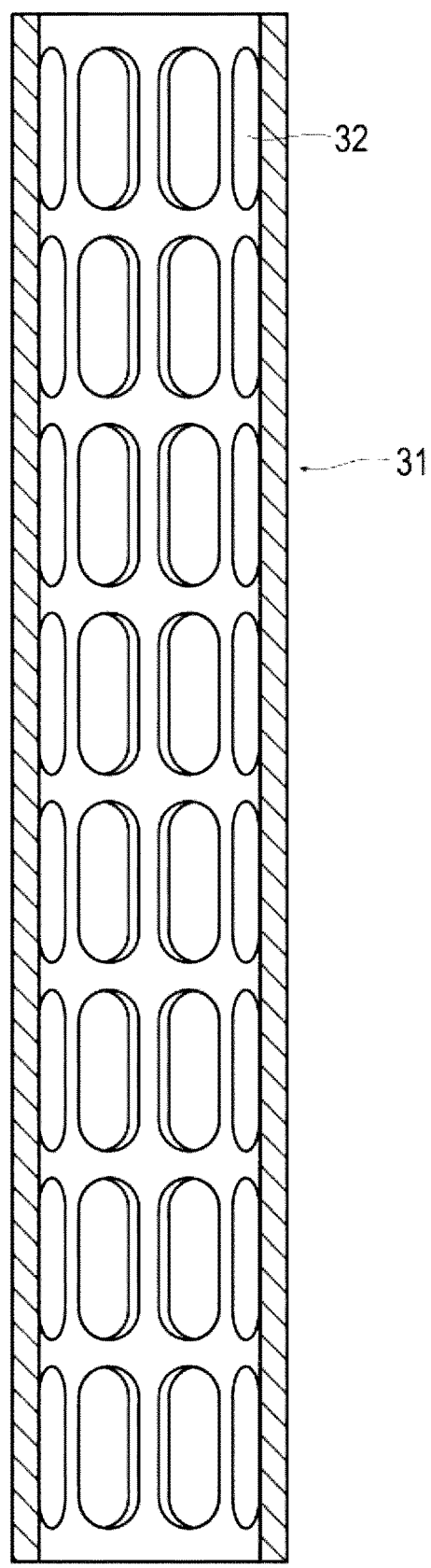
FIG. 6 is a central longitudinal cross-sectional view of the inner tubular member shown in FIG. 5.
Figure 7:
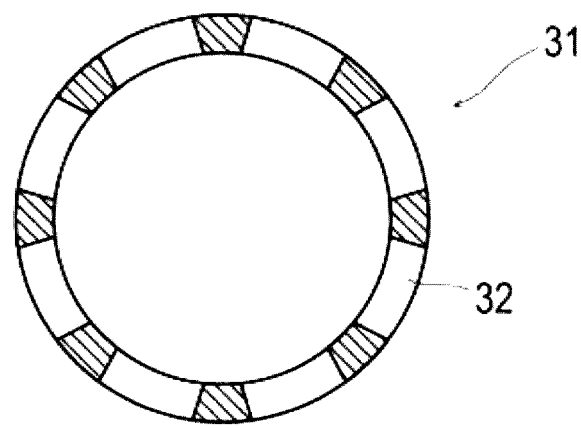
FIG. 7 is a cross-sectional view taken along a line B-B in FIG. 5.

The inner tubular member 31 includes a large number of the blood flow openings 32 on the side surface thereof. Regarding a size of the openings 32, a total area is preferably large as long as a required strength of the tubular member is maintained. For example, as shown in FIG. 5 which is a front view, FIG. 6 which is a central longitudinal cross-sectional view of FIG. 5, and FIG. 7 which is a cross-sectional view taken along a line B-B in FIG. 5, in order to satisfy such a condition, it is preferable to provide a plurality of sets (8 sets/circumference in the drawings) of annular arrangement openings, in which a plurality of (for example, 4 to 24 openings, and 8 openings in the longitudinal direction in the drawing) openings 32 are provided at equal angular intervals on the circumference surface of the tubular member, in an axial direction of the tubular member. Further, the opening may be shaped into a circle, polygon, or ellipse, and is preferably shaped into an oval as shown in FIG. 5.

The inner tubular body 35 is not particularly limited in shape, and may be, for example, a cylindrical body, a polygonal tubular member, or a member having an elliptical cross-section. A cylindrical body is preferable. A distance between a distal end opening of the inner tubular body 35 and the first partition wall 25 is not particularly limited, may be a distance same as that used in the known oxygenator, and is preferably about mm to 50 mm. An inner diameter of the inner tubular body 35 is not particularly limited, may be the same as an inner diameter of an inner tubular body used in the known oxygenator, and is preferably about 10 mm to 30 mm.

A thickness of the tubular hollow fiber membrane bundle 22 is not particularly limited, may be the same as a thickness of a tubular hollow fiber membrane bundle used in the known oxygenator, is preferably 5 mm to mm, and particularly preferably 10 mm to 28 mm. A filling rate of the hollow fiber membrane with respect to a tubular space formed between an outer side surface and an inner side surface of the tubular hollow fiber membrane bundle 22 is also not particularly limited, may be a filling rate in the known oxygenator, is preferably 40% to 85%, and particularly preferably 45% to 80%. The outer diameter of the hollow fiber membrane bundle 22 may be the same as an outer diameter of a hollow fiber membrane bundle used in the known oxygenator, is preferably 30 mm to 170 mm, and particularly preferably 70 mm to 130 mm. Such a configuration is employed as a gas exchange membrane.

The hollow fiber membrane bundle 22 can be formed by winding the hollow fiber membrane around the inner tubular member 31, and specifically, by forming a hollow fiber membrane bobbin using the inner tubular member 31 as a core, fixing both ends of the formed hollow fiber membrane bobbin by a partition wall, and then cutting the both ends of the hollow fiber membrane bobbin and the inner tubular member 31 as the core. By this cutting, the hollow fiber membrane opens on an outer surface of the partition wall. A method for forming the hollow fiber membrane is not limited to the method described above, and may be similar to another known method for forming the hollow fiber membrane or the known method that is suitably modified.

In particular, it is preferable to wind one hollow fiber membrane or to wind a plurality of hollow fiber membranes simultaneously around the inner tubular member 31 in such a manner that substantially parallel and adjacent hollow fiber membranes are spaced at substantially constant intervals. Accordingly, an uneven flow of the blood can be reduced more effectively. A distance between the hollow fiber membranes adjacent to each other is not limited to the following, and is preferably 1/10 to 1/1 of the outer diameter of the hollow fiber membrane. Further, the distance between the hollow fiber membranes adjacent to each other is preferably 30 μm to 200 μm.

Further, the hollow fiber membrane bundle 22 is formed by winding one hollow fiber membrane or winding a plurality of (preferably 2 to 16) hollow fiber membranes simultaneously around the inner tubular member 31 in such a manner that all adjacent hollow fiber membranes have a substantially constant interval, and is preferably formed by winding the hollow fiber membranes around the inner tubular member 31 by operating a rotator for rotating the inner tubular member 31 and a winder for weaving the hollow fiber membranes under conditions of the following Equation (1) when winding the hollow fiber membranes around the inner tubular member.

$$\text{Traverse [mm/lot]} \cdot n(\text{integer}) = \text{traverse winding width} \cdot 2 \pm (\text{fiber outer diameter} + \text{interval}) \cdot \text{number of winding fibers} \quad \text{Equation (1)}$$

By satisfying the above conditions, formation of the uneven flow of the blood can be further reduced. A value of "n" in Equation (1), that is, a relation between the number of rotations of the winding rotator and the number of reciprocations of the winder, is not particularly limited, and is typically 1 to 5, and preferably 2 to 4.

As shown in FIG. 2, in the hollow fiber membrane type oxygenator 20, the coating layer 16 containing the silicone compound is also formed on the inner surface $3c'$ of the hollow fiber membranes 3 through which the oxygen-containing gas flows. The coat 18 containing the antithrombotic polymer compound is formed on the outer surface $3a'$ (in some cases, the outer surface $3a'$ and the outer layer $3a$) of the hollow fiber membranes 3 serving as the blood contact portion. Here, a preferred form (an inner diameter, an outer diameter, a thickness, a porosity, a pore diameter of a pore, and the like) of the hollow fiber membranes is not particularly limited, and may be a form similar to that described in FIG. 1.

Next, the method for manufacturing an oxygenator according to the invention will be described in detail. The manufacturing method is a method for manufacturing an oxygenator having a plurality of porous hollow fiber membranes for gas exchange, the method including: dissolving a silicone compound in an organic solvent having a surface tension of less than 70 dyn/cm to prepare a coating solution; and bringing an inner surface of the hollow fiber membranes into contact with the coating solution while bringing an outer surface of the hollow fiber membranes into contact with water to form a coating layer containing the silicone compound (the silicone compound used for preparing the coating solution and/or a crosslinked product of the silicone compound) on the inner surface.

In the manufacturing method according to the invention, first, the silicone compound is dissolved in the organic solvent having a surface tension of less than 70 dyn/cm to prepare the coating solution (simply referred to as a "(1) coating solution preparation step", a "coating solution preparation step", or a "step (1)"). Then, the inner surface of the hollow fiber membranes is brought into contact with the coating solution while the outer surface of the hollow fiber membrane is brought into contact with water (also simply referred to as a "(2) coating solution application step", a "coating solution application step", or a "step (2)"). Hereinafter, these steps will be described.

(1) Coating Solution Preparation Step

In the step, the coating solution to be applied to the inner surface of the hollow fiber membranes is prepared. As described above, the coating solution contains the silicone compound and the organic solvent having a specific surface tension.

(Silicone Compound)

In the present specification, the silicone compound has a function of reducing the leakage of the blood plasma from the outer surface to the inner surface of the hollow fiber membrane. In the hollow fiber membrane type oxygenator, there may be a problem that the gas exchange performance is reduced due to a phenomenon called wet lung, that is, moisture vaporized from the blood is stored in the lumen of the hollow fiber membrane, and the silicone compound also has a function of reducing the wet lung. The silicone compound is not particularly limited as long as it is a polymer compound having a siloxane bond (Si—O—Si) in a main skeleton. Among these, the silicone compound is preferably a silicone compound represented by the following Formula (1) because a coating layer excellent in the blood plasma leakage resistance can be formed. That is, according to a preferred embodiment of the invention, there is provided a method for manufacturing an oxygenator using the silicone compound represented by the following Formula (1).

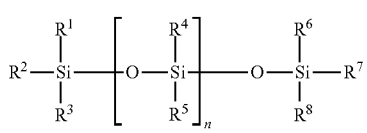

In Formula (1), $R^1$ to $R^8$ each independently represent an alkyl group having 1 or more and 6 or less carbon atoms, an aromatic hydrocarbon group having 6 or more and 30 or less carbon atoms, or a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group (a fluoro group, a chloro group, a bromo group, and an iodo group). n is 1 or more and 100,000 or less.

In the silicone compound represented by Formula (1), all of $R^1$ to $R^8$ may be each independently an alkyl group having 1 or more and 6 or less carbon atoms or an aromatic hydrocarbon group having 6 or more and 30 or less carbon atoms, and it is preferable that at least one of $R^1$ to $R^8$ is a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group. More preferably, at least one of $R^1$ to $R^3$ and at least one of $R^6$ to $R^8$ each independently represent a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group, and the rest of $R^1$ to $R^3$, $R^4$, $R^5$, and the rest of $R^6$ to $R^8$ each independently represent an alkyl group having 1 or more and 6 or less carbon atoms or an aromatic hydrocarbon group having 6 or more and 30 or less carbon atoms. Still more preferably, one of $R^1$ to $R^3$ and one of $R^6$ to $R^8$ each independently represent a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group, and the rest two of $R^1$ to $R^3$, $R^4$, $R^5$, and the rest two of $R^6$ to $R^8$ each independently represent an alkyl group having 1 or more and 6 or less carbon atoms or an aromatic hydrocarbon group having 6 or more and 30 or less carbon atoms. Since the silicone compound represented by Formula (1) has a reactive group, a crosslinking reaction proceeds in the process of forming of the coating layer (for example, in the process of drying the organic solvent), which leads to generation of a crosslinked product of the silicone compound. Accordingly, adhesion and durability of the coating layer can be improved.

When the silicone compound (preferably the silicone compound represented by Formula (1)) used for preparing the coating solution does not have a reactive group, the silicone compound may be contained in the coating layer formed on the inner surface of the hollow fiber membrane as it is. On the other hand, when the silicone compound (preferably the silicone compound represented by Formula (1)) used for preparing the coating solution has a reactive group as described above, the coating layer formed on the inner surface of the hollow fiber membrane may contain the silicone compound (that is, an uncrosslinked silicone compound) used for preparing the coating solution and/or the crosslinked product of the silicone compound.

Examples of the alkyl group having 1 or more and 6 or less carbon atoms or the aromatic hydrocarbon group having 6 or more and 30 or less carbon atoms in Formula (1) include a methyl group, an ethyl group, an n-propyl group, a phenyl group, and groups derived from fluorescein and a derivative thereof. Here, examples of the derivative of fluorescein include fluorescein isothiocyanate, N-hydroxysuccinimide fluorescein, Oregon Green, Tokyo Green, SNAFL, carboxyfluorescein, carboxyfluorescein diacetate, and aminofluorescein. Among these, a methyl group and an ethyl group are preferable, and a methyl group is more preferable from viewpoints of fluidity and a Young's modulus after curing. Examples of the ethylenically unsaturated bond-containing group having 1 or more and 6 or less carbon atoms include a vinyl group, a vinyloxy group, an allyl group, an allyloxy group, a propenyl group, and a propenyloxy group. Examples of a functional group containing an amino group include an amino group and an aminophenyl group. Examples of a functional group containing a hydroxy group include a hydroxy group, a phenol group, and a catechol group. Examples of a functional group containing a carboxy group include a carboxy group and a maleic acid group. Examples of a functional group containing a maleimide group include a maleimide group. Examples of a functional group containing a thiol group include a thiol group and a thiophenol group. Examples of the halogen group include a fluoro group, a chloro group, a bromo group, and an iodo group. Among these, since crosslinking reactivity is good, a vinyloxy group, an allyloxy group, and an allyl group are preferable, and a vinyloxy group is more preferable.

In one embodiment of the invention, the silicone compound is a silicone compound represented by Formula (1) in which at least one of $R^1$ to $R^3$ and at least one of $R^6$ to $R^8$ are each independently a vinyloxy group (—O—CH=CH$_2$), an allyloxy group (—O—CH$_2$CH=CH$_2$), or an allyl group, and the rest of $R^1$ to $R^3$, $R^4$, $R^5$, and the rest of $R^6$ to $R^8$ are each independently a methyl group or an ethyl group.

In one embodiment of the invention, the silicone compound is a silicone compound represented by Formula (1) in which one of $R^1$ to $R^3$ and one of $R^6$ to $R^8$ are each independently a vinyloxy group (—O—CH=CH$_2$), an allyloxy group (—O—CH$_2$CH=CH$_2$), or an allyl group, and the rest two of $R^1$ to $R^3$, $R^4$, $R^5$, and the rest two of $R^6$ to $R^8$ are each independently a methyl group or an ethyl group.

In one embodiment of the invention, the silicone compound is a silicone compound represented by Formula (1) in which one of $R^1$ to $R^3$ and one of $R^6$ to $R^8$ are vinyloxy groups (—O—CH=CH$_2$) and the rest two of $R^1$ to $R^3$, $R^4$, $R^5$, and the rest two of $R^6$ to $R^8$ are methyl groups.

n in Formula (1) is not particularly limited, and is preferably 1 or more and 100,000 or less, and more preferably 1 or more and 10,000 or less. When n falls within the above range, it is possible to cause the solution to pass through a lumen of a fiber (hollow fiber membrane) under a negative pressure.

The silicone compound may be either a commercial product or a synthetic product. Examples of the commercial product include SYLGARD® 184 and 186 manufactured by Dow Corning Corporation.

One kind of the silicone compound may be used alone or two or more kinds may be used in combination.

A concentration of the silicone compound in the coating solution is not particularly limited, and is preferably 10 mg/mL or more and less than 800 mg/mL from a viewpoint of improving fluidity of the coating solution in the lumen of the hollow fiber membrane. From a viewpoint of forming a coating layer having a sufficient thickness, the concentration is preferably 200 mg/mL or more and less than 800 mg/mL, more preferably more than 400 mg/mL and less than 800 mg/mL, and still more preferably 500 mg/mL or more and 750 mg/mL or less. That is, according to a preferred embodiment of the invention, provided is a method for manufacturing an oxygenator in which the concentration of the silicone compound in the coating solution is more than 400 mg/mL and less than 800 mg/mL. In a more preferred embodiment of the invention, the concentration of the silicone compound in the coating solution is 500 mg/mL or more and 750 mg/mL or less. With such a concentration, a coating layer having sufficient blood plasma leakage resistance can be formed by one time of a coating solution application step. When the coating layer is to be formed by a plurality of times of the coating solution application step, since the coating layer having sufficient thickness can be formed even though the concentration is low, the concentration is preferably 10 mg/mL or more and less than 200 mg/mL, and more preferably mg/mL or more and 70 mg/mL or less. Also in this case, a total concentration of the silicone compound in the coating solution used in the steps (the total obtained by "concentration of silicone compound in coating solution used in step×number of coating times using coating solution") is preferably 200 mg/mL or more and less than 800 mg/mL, more preferably more than 400 mg/mL and less than 800 mg/mL, and still more preferably 500 mg/mL or more and 750 mg/mL or less. That is, in a preferred embodiment of the invention, the total of the concentration of the silicone compound in the coating solution used in steps is more than 400 mg/mL and less than 800 mg/mL. In a more preferred embodiment of the invention, the total of the concentration of the silicone compound in the coating solution used in steps is 500 mg/mL or more and 750 mg/mL or less.

(Organic Solvent)

The organic solvent is used for a purpose of dissolving the silicone compound. In the manufacturing method according to the present embodiment, it is essential that the organic solvent has a surface tension of less than 70 dyn/cm in order to pass the coating solution through the lumen of the hollow fiber membrane. When the surface tension of the organic solvent is 70 dyn/cm or more, solubility of the silicone compound may be reduced or passing of the coating solution is difficult, and thus the coating layer may not be formed satisfactorily. From a viewpoint of improving the solubility of the silicone compound and the fluidity of the coating solution in the lumen of the hollow fiber membrane, the surface tension of the organic solvent is preferably 50 dyn/cm or less, more preferably 40 dyn/cm or less, and still more preferably 30 dyn/cm or less. A lower limit of the surface tension is not particularly limited, and is preferably 15 dyn/cm from a viewpoint of causing the coating solution to flow in the hollow fiber without any problem and a viewpoint of preventing the coating solution from permeating the pores in the hollow fiber membrane. A numerical value range of the surface tension of the organic solvent is preferably 15 dyn/cm or more and less than 70 dyn/cm, more preferably 15 dyn/cm or more and 50 dyn/cm or less, still more preferably 15 dyn/cm or more and 40 dyn/cm or less, and particularly preferably 15 dyn/cm or more and 30 dyn/cm or less. Note that 1 dyn/cm is 0.001 N/m.

In the present specification, the surface tension of the organic solvent (when two or more kinds of organic solvents are mixed and used, a surface tension of a mixed organic solvent) can be measured at 20° C. using a Du Nuoy surface tensiometer (manufactured by Ito Seisakusho Co., Ltd.). Specifically, a platinum ring is hung on a tip of a thin rod attached to a center of a steel wire and is brought into contact with a surface of an organic solvent at a horizontal position. The steel wire is twisted by turning a knob to pull up the platinum ring. A value at a moment when the platinum ring separates from the solvent surface is read with a scale plate and a pointer, and the value is taken as the surface tension (dyn/cm) of the organic solvent.

Examples of the organic solvent include an aromatic hydrocarbon such as toluene (28.5 dyn/cm) and xylene (28.4 dyn/cm), cyclohexane (25.3 dyn/cm), n-hexane (18.4 dyn/cm), n-heptane (20.1 dyn/cm), diethyl ether (16.96 dyn/cm), diisopropyl ether (17.1 dyn/cm), methyl hexyl ether (23.5 dyn/cm), ethyl acetate (24.0 dyn/cm), butyl acetate (25.2 dyn/cm), isopropyl laurate (30.1 dyn/cm), isopropyl myristate (28.3 dyn/cm), methyl ethyl ketone (24.6 dyn/cm), methyl isobutyl ketone (23.9 dyn/cm), lauryl alcohol (24.0 dyn/cm), acetone (23.3 dyn/cm), butyl alcohol (25.4 dyn/cm), 1-propanol (23.7 dyn/cm), isopropanol (23.0 dyn/cm), 2-ethylhexanol (26.9 dyn/cm), chloroform (26.7 dyn/cm), and a fluorine-based solvent such as hydrofluoroether (13.6 dyn/cm), hydrofluoroolefin (17.9 dyn/cm), hydrofluorocarbon (13.6 dyn/cm), hydrochlorofluoroolefin (14.6 dyn/cm), and hydrochlorofluorocarbon (12.7 dyn/cm). Among these, from a viewpoint that the silicone compound can be satisfactorily dissolved and a viewpoint that the organic solvent can be easily removed at a low boiling point, n-hexane, cyclohexane, acetone, butyl alcohol, 1-propanol, isopropanol, chloroform, diethyl ether, an aromatic hydrocarbon, and a fluorine-based solvent are preferable, and n-hexane and acetone are more preferable. One kind of these solvents may be used alone or two or more kinds may be used in combination. That is, according to a preferred embodiment of the invention, provided is a method for manufacturing an oxygenator in which the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent. In a more preferred embodiment of the invention, the organic solvent is n-hexane or acetone. As long as a surface tension of a solvent for dissolving the silicone compound is less than dyn/cm, an organic solvent having a surface tension of dyn/cm or more may be contained.

According to a preferred embodiment of the invention, the organic solvent preferably has low solubility in water. Specifically, the solubility of the organic solvent in 100 mL of water at 20° C. is preferably mg/100 mL or less. By preparing the coating solution using an organic solvent that hardly dissolves in water, even when water and the coating solution are brought into contact with each other in "(2) Coating Solution Application Step" described later, it is possible to prevent the coating solution from leaking to the outer surface of the hollow fiber membrane by forming a liquid-liquid interface between water and the coating solution. Therefore, the exposure of the silicone compound to the outer surface can be more reliably reduced.

Examples of the organic solvent having low solubility in water include an aromatic hydrocarbon such as toluene and xylene, cyclohexane, n-hexane, n-heptane, diethyl ether, diisopropyl ether, methyl hexyl ether, ethyl acetate, butyl acetate, isopropyl laurate, isopropyl myristate, methyl isobutyl ketone, lauryl alcohol, butyl alcohol, 2-ethylhexanol, chloroform, and a fluorine-based solvent such as hydrofluoroether, hydrofluoroolefin, hydrofluorocarbon, hydrochlorofluoroolefin, and hydrochlorofluorocarbon. One kind of these solvents may be used alone or two or more kinds may be used in combination.

The coating solution may contain an additive as necessary in addition to the above silicone compound and organic solvent. Examples of the additive include carnauba wax, PDMS-PEG, and a crosslinker.

(2) Coating Solution Application Step

In the step, the inner surface of the hollow fiber membranes is brought into contact with the coating solution while the outer surface of the hollow fiber membranes is brought into contact with water. The step may include other operations as necessary.

Here, as a form (a material, an inner diameter, an outer diameter, a thickness, a porosity, and a pore diameter of a pore) of the hollow fiber membrane to be coated with the coating solution, the form described in the above description relating to the oxygenator can be applied, and thus detailed description thereof will be omitted here.

The step may be applied to a hollow fiber membrane before assembling the oxygenator, or may be applied to a hollow fiber membrane after assembling the oxygenator. A specific operation method is not particularly limited as long as the inner surface of the hollow fiber membrane can be brought into contact with the coating solution while the outer surface of the hollow fiber membrane is brought into contact with water. When the step is applied to the hollow fiber membrane after assembling the oxygenator, for example, in a state in which the blood chamber of the hollow fiber membrane external perfusion type oxygenator is filled with water as shown in FIG. 1 or 3 described above, the step can be performed by passing the coating solution from one end of the hollow fiber membrane (for example, the gas inflow port of the oxygenator) to the other end of the hollow fiber membrane (for example, the gas outflow port of the oxygenator).

A portion to be brought into contact with water may be at least a part of the outer surface of the hollow fiber membrane, and is preferably the entire outer surface of the hollow fiber membrane. Accordingly, the exposure of the silicone compound can be reduced over the entire outer surface of the hollow fiber membrane. As a result, an oxygenator having an excellent antithrombotic property can be provided. A portion to be brought into contact with the coating solution may be at least a part of the inner surface of the hollow fiber membrane, and is preferably the entire inner surface of the hollow fiber membrane. Accordingly, the coating layer containing the silicone compound can be formed over the entire inner surface of the hollow fiber membrane. As a result, an oxygenator having excellent blood plasma leakage resistance can be provided.

The operation of bringing the inner surface of the hollow fiber membrane into contact with the coating solution may be performed by passing the coating solution from one end of the hollow fiber membrane (for example, the gas inflow port of the oxygenator) to the other end of the hollow fiber membrane (for example, the gas outflow port of the oxygenator). The solution passing may be performed by making the lumen of the hollow fiber membrane in a negative pressure or by pushing the coating solution.

A flow rate of the coating solution during solution passing is preferably 0.001 m/s to 1.0 m/s, and more preferably 0.1 m/s to 1.0 m/s. With such a flow rate, it is possible to apply a sufficient amount of the coating solution to the inner surface of the hollow fiber membrane while preventing the coating solution from leaking to the outer surface of the hollow fiber membrane.

An amount of the coating solution per membrane area ($m^2$) during solution passing is preferably 10 $mL/m^2$ to 10,000 $mL/m^2$, more preferably 30 $mL/m^2$ to 1,000 $mL/m^2$, and still more preferably 40 $mL/m^2$ to 200 $mL/m^2$. With such an amount, the coating solution can be applied over the entire inner surface of the hollow fiber membrane.

A contact time of the inner surface of the hollow fiber membrane being in contact with the coating solution is not particularly limited, and is preferably 1 s to 10,000 s, and more preferably 1 s to 100 s. With such a contact time, it is possible to apply the sufficient amount of the coating solution to the inner surface of the hollow fiber membrane while preventing the coating solution from leaking to the outer surface of the hollow fiber membrane.

(3) Fluid Flow Step

The manufacturing method according to the invention preferably further includes a step of causing a fluid to flow through the lumen of the hollow fiber membrane (also referred to simply as "(3) fluid flow step", "fluid flow step", or "step (3)") after the above "(2) Coating Solution Application Step". That is, according to a preferred embodiment of the invention, provided is a method for manufacturing an oxygenator in which the fluid is caused to flow through the lumen of the hollow fiber membrane after bringing the inner surface of the hollow fiber membrane into contact with the coating solution. Hereinafter, the step (3) will be described.

In the step, as described above, after the inner surface of the hollow fiber membrane is brought into contact with the coating solution, the fluid is caused to flow through the lumen of the hollow fiber membrane. By causing the fluid to flow (pass) through the lumen of the hollow fiber membrane, it is possible to remove an excess coating solution accumulated in the lumen of the hollow fiber membrane. Accordingly, clogging can be prevented and a thickness of the coating layer can be made more uniform, and thus gas permeability (particularly, gas flowability in the lumen of the hollow fiber membrane) of the oxygenator can be improved.

The fluid is not particularly limited as long as it is a gas or a liquid, and is preferably selected from the group consisting of air, an inert gas (nitrogen or a rare gas such as argon), water, and a lower alcohol. That is, according to a preferred embodiment of the invention, provided is a method for manufacturing an oxygenator in which the fluid is selected from the group consisting of air, an inert gas, water, and a lower alcohol. With such a fluid, the excess coating solution can be removed without adversely affecting the coating solution (coating film). Further, from a viewpoint of a cost and the like, air or water is more preferable.

An operation of causing the fluid to flow is not particularly limited. For example, the fluid may be caused to flow from one end of the hollow fiber membrane (for example, the gas inflow port of the oxygenator) to the other end of the hollow fiber membrane (for example, the gas outflow port of the oxygenator). The flow may be performed by making the lumen of the hollow fiber membrane in a negative pressure or pushing the fluid.

When the fluid is a gas (for example, air or an inert gas (nitrogen or a rare gas such as argon)), a flow rate is preferably 0.5 m/s to 10 m/s, and more preferably 1 m/s to 10 m/s. With such a flow rate, the excess coating solution can be removed without adversely affecting the coating solution (coating film). A flow time is preferably 10 s or longer, and more preferably 3,600 s or longer, from the viewpoint of sufficiently removing the excess coating solution. An upper limit value of the flow time is not particularly limited, and is about 168 hours. When the fluid is a gas (for example, air or an inert gas (nitrogen or a rare gas such as argon)), the (3) fluid flow step and a (4) drying step described later may be performed separately or may be the same step.

When the fluid is a liquid (for example, water or a lower alcohol), the flow rate is preferably m/s to 1.0 m/s, and more preferably 0.1 m/s to 1.0 m/s. The flow time is preferably 1 s to 100 s, and more preferably 10 s to 100 s. With such a flow rate and such a flow time, the excess coating solution can be removed without adversely affecting the coating solution (coating film).

A temperature of the fluid is not particularly limited, preferably 10° C. to 45° C., and more preferably 20° C. to 40° C. With such a temperature, the excess coating solution can be removed without adversely affecting the coating solution (coating film).

The water that has been brought into contact with the outer surface of the hollow fiber membrane in the step (2) may be subjected to the step (3) as it is, and the step (3) is preferably performed after water that has been brought into contact with the outer surface is removed in advance.

(4) Drying Step

The manufacturing method according to the invention may further include a step of drying the hollow fiber membrane (simply referred to as a "(4) drying step", a "drying step", or a "step (4)") after the above "(2) Coating Solution Application Step" (preferably after the above "(3) Fluid Flow Step"). Hereinafter, the step (4) will be described.

In the step, water, an organic solvent, and the like adhering to a surface of the hollow fiber membrane are removed by drying the hollow fiber membrane that has been subjected to the (2) coating solution application step (preferably the (3) fluid flow step). In particular, when the silicone compound (preferably the silicone compound represented by Formula (1)) has a crosslinking group, crosslinking of the silicone compound proceeds in the step, and the coating layer containing the silicone compound (the silicone compound used for preparing the coating solution and/or a crosslinked product of the silicone compound) is formed.

The drying method is not particularly limited as long as water, an organic solvent, and the like can be removed, and a known method can be appropriately adopted. Specifically, examples thereof include vacuum drying, heat drying, air drying (drying by exposure to a gas), and centrifugal drying, and two or more kinds may be appropriately combined. A drying temperature in the heat drying is preferably 45° C. to 80° C., and a drying time is preferably 1 hour to 48 hours. As described above, when the gas is caused to flow in the (3) fluid flow step, the (3) fluid flow step may also serve as the (4) drying step. The drying temperature when the gas is caused to flow (a temperature of the flowing gas) is preferably 10° C. or higher and lower than 45° C., more preferably 20° C. or higher and 40° C. or lower, and the drying time is preferably 12 hours to 60 hours.

A membrane thickness of the coating layer after drying is not particularly limited, and is preferably 0.1 μm to 10 μm, more preferably 0.5 μm to 7 μm, and still more preferably 1 μm to 5 μm. When the membrane thickness of the coating layer is 0.1 μm or more, sufficient blood plasma leakage resistance is obtained. When the membrane thickness of the coating layer is 10 μm or less, a decrease in the gas exchange performance can be prevented.

Through the above steps (1) and (2) (optionally further including the step (3) and/or step (4)), the coating layer containing the silicone compound is formed on the inner surface of the hollow fiber membrane. The method for manufacturing an oxygenator according to the present embodiment may optionally further include another step in addition to the steps (1) and (2) (optionally further including the step (3) and/or the step (4)). Examples of the another step include the following (5) antithrombotic coat forming step. The step is preferably performed after steps (1) and (2) (optionally further including step (3) and/or step (4)).

(5) Antithrombotic Coat Forming Step

In the step, a coat containing an antithrombotic polymer compound is formed on the outer surface of the hollow fiber membrane. That is, according to a preferred embodiment of the invention, provided is a method for manufacturing an oxygenator further including forming the coat containing the antithrombotic polymer compound on the outer surface of the hollow fiber membrane. The method for forming the antithrombotic polymer compound and the coat is not particularly limited, and a known method can be appropriately adopted.

(Antithrombotic Polymer Compound)

The antithrombotic polymer compound is a compound that imparts the antithrombotic property to the oxygenator by being applied to the outer surface of the hollow fiber membrane serving as the blood contact portion.

The antithrombotic polymer compound is not particularly limited as long as it has the antithrombotic property and the biocompatibility. Among antithrombotic polymer compounds, from the viewpoint of being excellent in the above properties, the antithrombotic polymer compound preferably has a structural unit derived from an alkoxyalkyl (meth)acrylate represented by the following Formula (I).

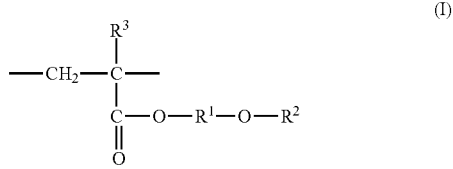

In Formula (I), $R^3$ represents a hydrogen atom or a methyl group, $R^1$ represents an alkylene group having 1 to 4 carbon atoms, and $R^2$ represents an alkyl group having 1 to 4 carbon atoms.

The compound having the structural unit represented by Formula (I) is excellent in the antithrombotic property and the biocompatibility (a platelet adhesion/attachment reducing and prevention effect and a platelet activation reducing and prevention effect), particularly the platelet adhesion/attachment reducing and prevention effect. Hence, by using the compound having the above structural unit, it is possible to manufacture an oxygenator excellent in the antithrombotic property and the biocompatibility (the platelet adhesion/attachment reducing and prevention effect and the platelet activation reducing and prevention effect), particularly the platelet adhesion/attachment reducing and prevention effect.

In the present specification, "(meth)acrylate" means "acrylate and/or methacrylate". That is, the "alkoxyalkyl (meth)acrylate" contains only alkoxyalkyl acrylate, only alkoxyalkyl methacrylate, or both alkoxyalkyl acrylate and alkoxyalkyl methacrylate.

In Formula (I), $R^1$ represents an alkylene group having 1 to 4 carbon atoms. Here, the alkylene group having 1 to 4 carbon atoms is not particularly limited, and examples thereof include linear or branched alkylene groups such as a methylene group, an ethylene group, a trimethylene group, a tetramethylene group, and a propylene group. Among these, an ethylene group and a propylene group are preferable, and an ethylene group is particularly preferable in consideration of the effect of further improving the antithrombotic property and the biocompatibility. $R^2$ represents an alkyl group having 1 to 4 carbon atoms. Here, the alkyl group having 1 to 4 carbon atoms is not particularly limited, and examples thereof include linear or branched alkyl groups such as a methyl group, an ethyl group, a propyl group, an isopropyl group, a butyl group, an isobutyl group, a sec-butyl group, and a tert-butyl group. Among these, a methyl group and an ethyl group are preferable, and a methyl group is particularly preferable in consideration of the effect of further improving the antithrombotic property and the biocompatibility. $R^3$ represents a hydrogen atom or a methyl group. When the antithrombotic polymer compound has two or more kinds of structural units derived from the alkoxyalkyl (meth)acrylate, the structural units may be the same as or different from each other.

Specifically, examples of the alkoxyalkyl (meth)acrylate include methoxymethyl acrylate, methoxyethyl acrylate, methoxypropyl acrylate, ethoxymethyl acrylate, ethoxyethyl acrylate, ethoxypropyl acrylate, ethoxybutyl acrylate, propoxymethyl acrylate, butoxyethyl acrylate, methoxybutyl acrylate, methoxymethyl methacrylate, methoxyethyl methacrylate, ethoxymethyl methacrylate, ethoxyethyl methacrylate, propoxymethyl methacrylate, and butoxyethyl methacrylate. Among these, from the viewpoint of further improving the antithrombotic property and the biocompatibility, methoxyethyl (meth)acrylate and methoxybutyl acrylate are preferable, and methoxyethyl acrylate (MEA) is particularly preferable. That is, the antithrombotic polymer compound is preferably polymethoxyethyl acrylate (PMEA). One of the above alkoxyalkyl (meth)acrylate may be used alone or two or more kinds may be used in combination.

The antithrombotic polymer compound according to the invention preferably has the structural unit derived from the alkoxyalkyl (meth)acrylate, and may be a polymer (homopolymer) having one or two or more kinds of structural units derived from the alkoxyalkyl (meth)acrylate, or may be a polymer (copolymer) having one or two or more kinds of structural units derived from the alkoxyalkyl (meth) acrylate and one or more kinds of structural units (other structural units) derived from a monomer copolymerizable with the alkoxyalkyl (meth)acrylate. When the antithrombotic polymer compound according to the invention has two or more structural units, a structure of the polymer (copolymer) is not particularly limited and may be any of a random copolymer, an alternating copolymer, a periodic copolymer, and a block copolymer. A terminal of the polymer is not particularly limited, is appropriately defined depending on a type of a raw material to be used, and is typically a hydrogen atom.

Here, a monomer (copolymerizable monomer) copolymerizable with the alkoxyalkyl (meth)acrylate in a case in which the antithrombotic polymer compound according to the invention has other structural units in addition to the structural unit derived from the alkoxyalkyl (meth)acrylate is not particularly limited. Examples of the monomer include methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hexyl acrylate, hexyl methacrylate, ethylene, propylene, acrylamide, N,N-dimethylacrylamide, N,N-diethylacrylamide, aminomethyl acrylate, aminoethyl acrylate, aminoisopropyl acrylate, diaminomethyl acrylate, diaminoethyl acrylate, diaminobutyl acrylate, methacrylamide, N,N-dimethylmethacrylamide, N,N-diethylmethacrylamide, aminomethyl methacrylate, aminoethyl methacrylate, diaminomethyl methacrylate, and diaminoethyl methacrylate. Among these, the copolymerizable monomer is preferably one having no hydroxy group or cationic group in a molecule. The copolymer may be any of a random copolymer, a block copolymer, and a graft copolymer, and can be synthesized by a known method such as radical polymerization, ionic polymerization, and polymerization using a macromer. Here, a proportion of the structural units derived from the copolymerizable monomer in all the structural units of the copolymer is not particularly limited. In consideration of the antithrombotic property, the biocompatibility, and the like, the structural units derived from the copolymerizable monomer (other structural units) are preferably more than 0 mol % and 50 mol % or less in all the structural units of the copolymer. When the proportion is more than 50 mol %, the effect of the alkoxyalkyl (meth)acrylate may be deteriorated.

Here, a weight average molecular weight of the antithrombotic polymer compound is not particularly limited, and is preferably 80,000 or more. In the method for manufacturing an oxygenator according to the present embodiment, the antithrombotic polymer compound is applied to the outer surface of the hollow fiber membrane in a form of an aqueous coating solution. Therefore, from a viewpoint of easily preparing a desired aqueous coating solution, the weight average molecular weight of the antithrombotic polymer compound is preferably less than 800,000. Within the above range, aggregation or precipitation of the antithrombotic polymer compound in a solution containing the compound is reduced, and a stable aqueous coating solution can be prepared. Further, the weight average molecular weight of the antithrombotic polymer compound is preferably more than 200,000 and less than 800,000, more preferably 210,000 or more and 600,000 or less, still more preferably 220,000 or more and 500,000 or less, and particularly preferably 230,000 or more and 450,000 or less.

In the present specification, the "weight average molecular weight" is measured by gel permeation chromatography (GPC) using a polystyrene as a standard substance and tetrahydrofuran (THF) as a mobile phase. Specifically, a polymer to be analyzed is dissolved in THF to prepare a 10 mg/ml solution. With respect to the polymer solution prepared in this way, a GPC column LF-804 manufactured by Shodex is attached to a GPC system LC-20 manufactured by Shimadzu Corporation, THF flows as a mobile phase, and GPC of the polymer to be analyzed is measured using a polystyrene as a standard substance. After a calibration curve is prepared using a standard polystyrene, the weight average molecular weight of the polymer to be analyzed is calculated based on the curve.

It is inferred that by increasing a molecular weight of the antithrombotic polymer compound, a content of a polymer having a relatively small molecular weight contained in the coat can be reduced, and thus an effect of reducing or preventing elution of a polymer having a relatively small molecular weight into blood is also obtained. Therefore, when the weight average molecular weight of the antithrombotic polymer compound is within the above range, elution of the coat (particularly, a polymer having a small molecular weight) into the blood can be more effectively reduced or prevented. It is also preferable from the viewpoint of the antithrombotic property and the biocompatibility. In the present specification, the "polymer having a small molecular weight" refers to a polymer having a weight average molecular weight of less than 60,000. A method for measuring the weight average molecular weight is as described above.

The antithrombotic polymer compound having the structural unit derived from the alkoxyalkyl (meth)acrylate represented by Formula (I) can be manufactured by a known method. Specifically, preferably used is a method of stirring an alkoxyalkyl (meth)acrylate represented by the following Formula (II), one or two or more monomers (copolymerizable monomers) added as necessary, copolymerizable with the alkoxyalkyl (meth)acrylate and a polymerization initiator in a polymerization solvent to prepare a monomer solution, and heating the monomer solution to polymerize the alkoxyalkyl (meth)acrylate or copolymerize the alkoxyalkyl (meth)acrylate and the copolymerizable monomers added as necessary.

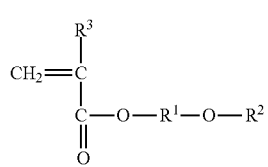

(II)

In the above Formula (II), substituents $R^1$, $R^2$, and $R^3$ are the same as defined in the above Formula (I), and thus the description thereof will be omitted here.

The polymerization solvent that can be used in the preparation of the monomer solution is not particularly limited as long as the alkoxyalkyl (meth)acrylate in the above Formula (II) to be used and the copolymerizable monomer added as necessary can be dissolved. Examples of the polymerization solvent include: aqueous solvents, for example, water, alcohols such as methanol, ethanol, propanol, and isopropanol, and polyethylene glycols; aromatic solvents such as toluene, xylene, and tetralin; and halogen-based solvents such as chloroform, dichloroethane, chlorobenzene, dichlorobenzene, and trichlorobenzene. Among these, methanol is preferable in consideration of dissolubility of the alkoxyalkyl (meth)acrylate and availability of a polymer having the weight average molecular weight as described above.

A monomer concentration in the monomer solution is not particularly limited, and the weight average molecular weight of the obtained antithrombotic polymer compound can be increased by setting the concentration relatively high. Therefore, in consideration of the availability of the polymer having the weight average molecular weight as described above, the monomer concentration in the monomer solution is preferably less than 50 mass %, and more preferably 15 mass % or more and less than 50 mass %. The monomer concentration in the monomer solution is more preferably mass % or more and 48 mass % or less, and particularly preferably 25 mass % or more and 45 mass % or less. When two or more kinds of monomers are used, the monomer concentration means a total concentration of these monomers.

The polymerization initiator is not particularly limited, and may be a known polymerization initiator. The polymerization initiator is preferably a radical polymerization initiator from a viewpoint of being excellent in polymerization stability. Specifically, examples of the radical polymerization initiator include: persulfates such as potassium persulfate (KPS), sodium persulfate, and ammonium persulfate; peroxides such as hydrogen peroxide, t-butyl peroxide, and methyl ethyl ketone peroxide; and azo compounds such as azobisisobutyronitrile (AIBN), 2,2'-azobis(4-methoxy-2,4-dimethylvaleronitrile), 2,2'-azobis(2,4-dimethylvaleronitrile), 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamidine) dihydrochloride, 2,2'-azobis[N-(2-carboxyethyl)-2-methylpropionamidine)] hydrate, 3-hydroxy-1,1-dimethylbutyl peroxyneodecanoate, α-cumyl peroxyneodecanoate, 1,1,3,3-tetrabutyl peroxyneodecanoate, t-butyl peroxyneodecanoate, t-butyl peroxyneoheptanoate, t-butyl peroxypivalate, t-amyl peroxyneodecanoate, t-amyl peroxypivalate, di(2-ethylhexyl) peroxydicarbonate, di(sec-butyl) peroxydicarbonate, and azobiscyanovaleric acid. For example, a reducing agent such as sodium sulfite, sodium bisulfite, and ascorbic acid may be used in combination with the radical polymerization initiator as a redox initiator. An amount of the polymerization initiator to be mixed is preferably 0.0001 mol % to 1 mol %, more preferably 0.001 mol % to 0.8 mol %, and particularly preferably 0.01 mol % to 0.5 mol % with respect to a total amount of the monomers (the alkoxyalkyl (meth)acrylate and the copolymerizable monomer added as necessary; the same applies hereinafter). Alternatively, an amount of the polymerization initiator to be mixed is preferably 0.005 parts by mass to 2 parts by mass, and more preferably 0.05 parts by mass to 0.5 parts by mass with respect to 100 parts by mass of the monomers (all kinds of monomers when using a plurality of kinds of monomers). With such an amount of the polymerization initiator to be mixed, a polymer having a desired weight average molecular weight can be more efficiently manufactured.

The polymerization initiator may be mixed as it is with the monomer and the polymerization solvent, or may be mixed with the monomer and the polymerization solvent in a form of a solution in which the polymerization initiator is previously dissolved in another solvent. In the latter case, the another solvent is not particularly limited as long as it can dissolve the polymerization initiator, and examples thereof include a solvent similar to the polymerization solvent. The another solvent may be the same as or different from the polymerization solvent, and is preferably a solvent same as the polymerization solvent in consideration of polymerization controllability. In this case, the concentration of the polymerization initiator in the another solvent is not particularly limited, and an addition amount of the polymerization initiator is preferably 0.1 parts by mass to 10 parts by mass, more preferably 0.15 parts by mass to 5 parts by mass, and still more preferably 0.2 parts by mass to 1.8 parts by mass with respect to 100 parts by mass of the another solvent in consideration of mixability and the like.

Next, the monomer solution is heated to polymerize the alkoxyalkyl (meth)acrylate or to copolymerize the alkoxyalkyl (meth)acrylate and another monomer. Here, the polymerization method can be a known polymerization method such as radical polymerization, anionic polymerization, and cationic polymerization, and is preferably radical polymerization that enables easy manufacturing.

A polymerization condition is not particularly limited as long as the monomers (the alkoxyalkyl (meth)acrylate, or the alkoxyalkyl (meth)acrylate) and the copolymerizable monomer copolymerizable can be polymerized. Specifically, a polymerization temperature is preferably 30° C. to 60° C., and more preferably 40° C. to 55° C. A polymerization time is preferably 1 hour to 24 hours, and more preferably 3 hours to 12 hours. Under such a condition, the polymer having a large molecular weight as described above can be manufactured more efficiently. In addition, gelation in the polymerization step can be effectively reduced or prevented, and high manufacturing efficiency can be achieved.

As necessary, a chain transfer agent, a polymerization rate adjusting agent, a surfactant, and other additives may be appropriately used in the polymerization.

An atmosphere in which the polymerization reaction is performed is not particularly limited, and the polymerization reaction can be performed in an air atmosphere, an atmosphere of an inert gas such as a nitrogen gas and an argon gas, and the like. During the polymerization reaction, the reaction solution may be stirred.

A polymer after the polymerization can be purified by a general purification method such as a reprecipitation method, a dialysis method, an ultrafiltration method, and an extraction method. For a reason that a (co)polymer suitable for the preparation of the aqueous coating solution can be obtained, among the above methods, the purification is preferably performed by a reprecipitation method. At this time, ethanol is preferably used as a poor solvent used for reprecipitation.

The polymer after the purification can also be dried by any method such as freeze drying, vacuum drying, spray drying, and heat drying, and freeze drying or vacuum drying is preferable from a viewpoint that a physical property of the polymer is less affected.

(Aqueous Coating Solution Preparation)

Next, a method for preparing a solution containing the antithrombotic polymer compound (aqueous coating solution) will be described.

A solvent used for preparing the solution containing the antithrombotic polymer compound (aqueous coating solution) is not particularly limited as long as it can appropriately disperse the antithrombotic polymer compound to prepare the aqueous coating solution. From a viewpoint of more effectively preventing permeation of the aqueous coating solution from the outer surface to the inner surface (surface on the side where the oxygen-containing gas flows) of the pore in the hollow fiber membrane, the solvent preferably contains water. Here, water is preferably pure water, ion-exchanged water, or distilled water, and, among these, is more preferably distilled water.

The solvent other than water used in the preparation of the aqueous coating solution is not particularly limited, and methanol and acetone are preferable in consideration of easy control over dispersibility or the like of the antithrombotic polymer compound. One kind of the solvent other than water may be used alone or two or more kinds may be used in a form of a mixture. Among these, methanol is preferable in consideration of further easy control over the dispersibility or the like of the antithrombotic polymer compound. That is, the solvent preferably contains water and methanol. Here, a mixing ratio (mass ratio) of water to methanol is not particularly limited. In consideration of further easy control over the dispersibility of the antithrombotic polymer compound and an average particle diameter of a colloid, the mixing ratio of water to methanol is preferably 6:1 to 32:1, and more preferably 10:1 to 25:1. That is, the solvent preferably contains water and methanol at a mixing ratio (mass ratio) of 6:1 to 32:1, and more preferably contains water and methanol at a mixing ratio (mass ratio) of 10:1 to 25:1.

As described above, when the aqueous coating solution is prepared using a mixed solvent of water and a solvent other than water, the order of adding the solvent (for example, water and methanol) and the antithrombotic polymer compound is not particularly limited, and the aqueous coating solution is preferably prepared by the following procedure. That is, it is preferable to prepare an aqueous coating solution by a method of adding the antithrombotic polymer compound to the solvent (preferably methanol) other than water to prepare an antithrombotic polymer compound-containing solution, and subsequently adding the antithrombotic polymer compound-containing solution to water. According to such a method, the antithrombotic polymer compound is easily dispersed. Further, according to the above method, there is an advantage that a colloid having a uniform particle diameter can be formed, and a uniform coat can be easily formed.

In the above method, a rate of adding the antithrombotic polymer compound-containing solution to water is not particularly limited, and the antithrombotic polymer compound-containing solution is preferably added to water at a rate of 5 g/min to 100 g/min.

A stirring time and a stirring temperature during preparation of the aqueous coating solution are not particularly limited. From a viewpoint that the colloid having a uniform particle diameter can be easily formed and the colloid can be uniformly dispersed, the stirring is preferably performed for 1 min to 30 min, and more preferably performed for 5 min to 15 min after adding the antithrombotic polymer compound-containing solution to water. The stirring temperature is preferably 10° C. to 40° C., and more preferably 20° C. to 30° C.

A concentration of the antithrombotic polymer compound in the aqueous coating solution is not particularly limited, and is preferably 0.01 mass % or more from a viewpoint of easily increasing a coating amount. Further, from the above viewpoint, the aqueous coating solution more preferably contains the antithrombotic polymer compound at a concentration of 0.05 mass % or more, and particularly preferably at a concentration of 0.1 mass % or more. On the other hand, an upper limit of the concentration of the antithrombotic polymer compound in the aqueous coating solution is not particularly limited, and is preferably 0.3 mass % or less, and more preferably 0.2 mass % or less in consideration of, for example, easy formation of the coat and an effect of reducing uneven coating. Within such ranges, a decrease in the gas exchange performance due to an excessively thick coat of the antithrombotic polymer compound is also reduced.

(Aqueous Coating Solution Application Step)

Next, the aqueous coating solution prepared as described above is applied (covered) on the outer surface of the hollow fiber membrane. Specifically, after the oxygenator (for example, the oxygenator having the structure as shown in FIG. 1 or 3 described above) is assembled, the aqueous coating solution is brought into contact with (or is caused to flow through) the outer surface of the hollow fiber membrane to cover the outer surface (that is, the blood contact portion) of the hollow fiber membrane with the antithrombotic polymer compound. Accordingly, a coating film containing the antithrombotic polymer compound is formed on the outer surface of the hollow fiber membrane. The application of the aqueous coating solution to the hollow fiber membrane may be performed before the assembly of the oxygenator as long as the aqueous coating solution is brought into contact with (or is caused to flow through) the outer surface of the hollow fiber membrane.

The method of bringing the outer surface of the hollow fiber membrane into contact with the aqueous coating solution containing the antithrombotic polymer compound is not particularly limited, and can be a known method in the related art such as filling or dip coating (dipping method). Among these, filling is preferable to increase the coating amount of the antithrombotic polymer compound.

When filling is used as the method of bringing the outer surface of the hollow fiber membrane into contact with the aqueous coating solution containing the antithrombotic polymer compound, the filling amount of the aqueous coating solution is preferably 50 g/m$^2$ or more, and more preferably 80 g/m$^2$ or more, per membrane area (m$^2$) of the hollow fiber membrane. When the filling amount is 50 g/m$^2$ or more, a coat containing a sufficient amount of the antithrombotic polymer compound can be formed on the surface of the hollow fiber membrane. On the other hand, an upper limit value of the filling amount Is not particularly limited, and is preferably 200 g/m$^2$ or less, and more preferably 150 g/m$^2$ or less.

In the present specification, the "membrane area" refers to an area of the outer surface of the hollow fiber membrane, and is obtained from a product of an outer diameter, circular constant, the number, and an effective length of the hollow fiber membrane.

A time of bringing the outer surface of the hollow fiber membrane into contact with the aqueous coating solution containing the antithrombotic polymer compound is also not particularly limited, and is preferably 0.5 min or longer and 100 min or shorter, more preferably 1 min or longer and 70 min or shorter, and still more preferably 1 min or longer and 30 min or shorter in consideration of the coating amount, the easy formation of the coating film, the effect of reducing uneven coating, and the like. A temperature of the aqueous coating solution being in contact with the hollow fiber membrane (flow temperature of the aqueous coating solution to a blood flow side of the oxygenator) is preferably 5° C. to 40° C., and more preferably 15° C. to 30° C. in consideration of the coating amount, the easy formation of the coating film, the effect of reducing uneven coating, and the like.

The amount of the antithrombotic polymer compound applied to the outer surface of the hollow fiber membrane is not particularly limited, and is preferably such an amount that a thickness of the coat after drying is about 5 nm to 20 μm. When the above thickness cannot be obtained by one time of application (contact), the application step may be repeated until a desired thickness is obtained.

After being in contact with the aqueous coating solution, the coating film is dried to form, on the outer surface of the hollow fiber membrane, a cover (coat) made of the antithrombotic polymer compound according to the invention. Here, a drying condition is not particularly limited as long as the cover (coat) made of the antithrombotic polymer compound can be formed on the outer surface (and further the outer layer) of the hollow fiber membrane. Specifically, the drying temperature is preferably 5° C. to 50° C., and more preferably ° C. to 40° C. The drying time is preferably 60 min to 300 min, and more preferably 120 min to 240 min. Alternatively, the coating film may be dried by allowing a gas with preferably 5° C. to 40° C., more preferably 15° C. to ° C., to continuously or stepwise flow through the hollow fiber membrane. Here, a type of the gas is not particularly limited as long as it does not affect the coating film and can dry the coating film. Specifically, examples of the gas include air and an inert gas such as a nitrogen gas and an argon gas. A flow amount of the gas is not particularly limited as long as the coating film can be sufficiently dried, and is preferably 5 L to 150 L, and more preferably 30 L to 100 L.

Through the above steps, there is obtained an oxygenator in which a coating layer containing the silicone compound is formed on the inner surface of the hollow fiber membrane and the coat containing the antithrombotic polymer compound is formed on the outer surface of the hollow fiber membrane. Accordingly, according to the manufacturing method of the embodiment, an oxygenator having both a desired antithrombotic property and blood plasma leakage resistance can be provided.

EXAMPLES

The effects of the invention will be described using the following examples. However, a technical scope of the invention is not limited to the following examples. In the following examples, unless otherwise specified, an operation is performed at room temperature (25° C.). Unless otherwise specified, "%" and "parts" mean "mass %" and "parts by mass", respectively.

Manufacturing Example 1

(Oxygenator Preparation)

A bundle of 20,000 porous hollow fiber membranes for gas exchange (a) each made of a porous polypropylene having an inner diameter of 112 μm, an outer diameter of 170 μm, a thickness of 29 μm, a porosity of about 30 vol %, and an outer surface pore diameter (that is, a pore diameter of an opening) of 50 nm was wound to prepare a blood external perfusion type hollow fiber membrane oxygenator (a) having a membrane area (area of the outer surface of the hollow fiber membrane) of 1.9 m$^2$.

Example 1

(Coating Solution Preparation)

Polydimethylsiloxane (vinyl-terminated PDMS, SYLGARD® 184; the same applies hereinafter) was dissolved in n-hexane (surface tension: 18.4 dyn/cm; the same applies hereinafter) to have a concentration of 600 mg/mL to prepare a coating solution (1).

Polydimethylsiloxane (vinyl-terminated PDMS, SYLGARD® 184) has a structure represented by the above Formula (1) in which $R^1$, $R^3$, $R^4$, $R^5$, $R^6$, and $R^8$ are methyl groups, and $R^2$ and $R^7$ are vinyloxy groups (—O—CH=CH$_2$).

(Coating Layer Formation)

Water was filled in a blood flow path of the blood external perfusion type hollow fiber membrane oxygenator (a), and an outer surface of a hollow fiber membrane was brought into contact with water. In this state, the coating solution (1) was caused to flow from a gas inflow port to a gas outflow port at a flow rate of 0.1 m/s for 10 seconds to bring an inner surface of the hollow fiber membrane into contact with the coating solution (1). An amount of the coating solution at this time was 105 mL/m$^2$ per membrane area. Thereafter, the water in the blood flow path and the coating solution (1) in the gas flow path were removed, and air (25° C.) was caused to flow from the gas inflow port to the gas outflow port at a flow rate of 1.7 m/s for 48 hours. Accordingly, fluid flowing, drying for the hollow fiber membrane, and crosslinking for polydimethylsiloxane were performed, to manufacture a blood external perfusion type hollow fiber membrane oxygenator (1) (hereinafter, also simply referred to as an "oxygenator (1)") having a hollow fiber membrane (1) in which the coating layer (dry membrane thickness: 4 μm) was formed on the inner surface.

Example 2

(Coating Solution Preparation)
Polydimethylsiloxane was dissolved in n-hexane to have a concentration of 200 mg/mL to prepare a coating solution (2).
(Coating Layer Formation)
The operation same as in (coating layer formation) of Example 1 was performed except that the coating solution (2) was used, to manufacture a blood external perfusion type hollow fiber membrane oxygenator (2) (hereinafter, also simply referred to as an "oxygenator (2)") having a hollow fiber membrane (2) in which a coating layer (dry membrane thickness: 4 μm) was formed on the inner surface.

Example 3

(Coating Solution Preparation)
The operation same as in (Coating Solution Preparation) in Example 2 was performed and the coating solution (2) was prepared.
(Coating Layer Formation)
Water was filled in a blood flow path of the blood external perfusion type hollow fiber membrane oxygenator (a), and an outer surface of a hollow fiber membrane was brought into contact with water. In this state, the coating solution (2) was caused to flow from a gas inflow port to a gas outflow port at a flow rate of 0.1 m/s for 10 seconds to bring an inner surface of the hollow fiber membrane into contact with the coating solution (2). Thereafter, the water in the blood flow path and the coating solution (2) in the gas flow path were removed, followed by leaving in an oven at 60° C. for 12 hours. Accordingly, drying for the hollow fiber membrane and crosslinking for polydimethylsiloxane were performed, to manufacture a blood external perfusion type hollow fiber membrane oxygenator (3) (hereinafter, also simply referred to as an "oxygenator (3)") having a hollow fiber membrane (3) in which the coating layer (dry membrane thickness: 4 μm) was formed on the inner surface.

Example 4

(Coating Solution Preparation)
The operation same as in (Coating Solution Preparation) in Example 1 was performed and the coating solution (1) was prepared.
(Coating Layer Formation)
Water was filled in a blood flow path of the blood external perfusion type hollow fiber membrane oxygenator (a), and an outer surface of a hollow fiber membrane was brought into contact with water. In this state, the coating solution (1) was caused to flow from a gas inflow port to a gas outflow port at a flow rate of 0.1 m/s for 10 seconds to bring an inner surface of the hollow fiber membrane into contact with the coating solution. Thereafter, the water in the blood flow path and the coating solution (1) in the gas flow path were removed, and water (25° C.) was caused to flow from the gas inflow port to the gas outflow port at a flow rate of 0.1 m/s for 50 seconds. Thereafter, the water in the gas flow path was removed, followed by leaving in an oven at 60° C. for 12 hours. Accordingly, drying for the hollow fiber membrane and crosslinking for polydimethylsiloxane were performed, to manufacture a blood external perfusion type hollow fiber membrane oxygenator (4) (hereinafter, also simply referred to as an "oxygenator (4)") having a hollow fiber membrane (4) in which the coating layer (dry membrane thickness: 4 μm) was formed on the inner surface.

Comparative Example 1

(Coating Solution Preparation)
The operation same as in (Coating Solution Preparation) in Example 1 was performed and the coating solution (1) was prepared.
(Coating Layer Formation)
In a state in which a blood flow path of the blood external perfusion type hollow fiber membrane oxygenator (a) was filled with air, the coating solution (1) was caused to flow from a gas inflow port to a gas outflow port at a flow rate of 0.1 m/s for 10 seconds to bring an inner surface of the hollow fiber membrane into contact with the coating solution (1). Thereafter, the coating solution (1) in the gas flow path was removed, followed by leaving in an oven at 60° C. for 12 hours. Accordingly, drying for the hollow fiber membrane and crosslinking for polydimethylsiloxane were performed, to manufacture a comparative blood external perfusion type hollow fiber membrane oxygenator (1) (hereinafter, also simply referred to as a "comparative oxygenator (1)") having a comparative hollow fiber membrane (1) in which the coating layer (dry membrane thickness: 4 μm) was formed on the inner surface.

[Presence or Absence of Exposure of Silicone Compound]
With respect to the hollow fiber membranes (1) to (4) and the comparative hollow fiber membrane (1), the outer surface was visually observed to confirm whether the silicone compound was exposed. A case in which the exposure is confirmed is represented as "Yes", and a case in which the exposure is not confirmed is represented as "No". When the silicone compound is exposed on the outer surface, a coat containing an antithrombotic polymer compound is not formed on an exposed portion, and thus an oxygenator having a sufficient antithrombotic property may not be obtained.

[Gas Flowability in Lumen]
A nitrogen gas was blown from a gas inflow port to a gas outflow port of a hollow fiber membrane (a) (uncoated hollow fiber membrane) at a flow rate of 10 L/min, and a pressure difference (gas pressure loss $\Delta P_0$) between the gas inflow port and the gas outflow port was measured. Next, with respect to the hollow fiber membranes (1) to (4) and the comparative hollow fiber membrane (1), a nitrogen gas was blown from the gas inflow port to the gas outflow port at a flow rate of 10 L/min, and the pressure difference (gas pressure loss $\Delta P_1$) between the gas inflow port and the gas outflow port was measured. Then, an increase rate (%) of the gas pressure loss was calculated using a formula: $(\Delta P_1 - \Delta P_0) \times 100 / \Delta P_0$. When the increase rate of the gas pressure loss is 100(%) or less, gas flowability in the lumen of the hollow fiber membrane is excellent, and thus a sufficient gas exchange performance is exhibited.

[Blood Plasma Leakage Resistance]
The hollow fiber membranes (1) to (4) and the comparative hollow fiber membrane (1) were potted in an epoxy resin, and outside of the hollow fiber membrane was filled with a solution in which sodium dodecyl sulfate (SDS) was dissolved in a 0.9 w/v % aqueous sodium chloride solution to have a concentration of 1 mg/mL (SDS/saline solution). A pressure of 760 mmHg was applied to the SDS/saline solution, and the amount of the SDS/saline solution permeating from the outside of the hollow fiber membrane to the lumen in 600 seconds was measured to evaluate blood plasma leakage resistance. The blood plasma leakage resistance of the hollow fiber membrane (a) (uncoated hollow fiber membrane) was evaluated by the same method. A case in which an SDS/saline solution permeation amount is less than 0.2 mL/m$^2$·min·mmHg is represented as "A", a case in which the SDS/saline solution permeation amount is 0.2 mL/m$^2$·min·mmHg or more and less than 0.4 mL/m$^2$·min·mmHg is represented as "B", and a case in which the SDS/saline solution permeation amount is 0.4 mL/m$^2$·min·mmHg or more is represented as "C". The smaller the SDS/saline solution permeation amount, the better the blood plasma leakage resistance. When the SDS/saline solution permeation amount is less than 0.4 mL/m$^2$·min·mmHg (A or B), sufficient blood plasma leakage resistance suitable for long-term use is exhibited.

Results are shown in the following Table 1. In Example 1, the fluid flowing through the lumen is air, and Example 4 is different from Example 1 in that the fluid is water, but results for Example 1 and Example 4 are the same, and thus description of the result for Example 4 in following Table 1 is omitted.

TABLE 1

| | Contact between outer surface and water | Fluid flowing through lumen | Concentration (mg/mL) of coating solution | Presence or absence of exposure | Gas flowability (%) of lumen | Blood plasma leakage resistance |
|---|---|---|---|---|---|---|
| Example 1 | Yes | Yes | 600 | No | 13 | A |
| Example 2 | Yes | Yes | 200 | No | 10 | B |
| Example 3 | Yes | No | 200 | No | 89 | B |
| Comparative Example 1 | No | No | 600 | Yes | More than 200 | A |

The result for Example 4 is the same as that for Example 1, and thus the description thereof is omitted.

From the results shown in Table 1, it is understood that the silicone compound can be prevented from being exposed on the outer surface while forming the coating layer on the inner surface by bringing the inner surface of the hollow fiber membrane into contact with the coating solution while bringing the outer surface of the hollow fiber membrane into contact with water. Hence, according to the invention, an oxygenator having sufficient blood plasma leakage resistance can be provided. As described above, the coat containing the antithrombotic polymer compound is not formed (or hardly formed) at a portion on which the silicone compound is exposed. According to the invention, it is possible to reduce the silicone compound from being exposed on the outer surface, and thus it is possible to satisfactorily form the coat containing the antithrombotic polymer compound on the outer surface in a subsequent step. Hence, according to the invention, an oxygenator having a sufficient antithrombotic property can be obtained.

When Examples 1, 2, and 4 are compared with Example 3, it is understood that the gas flowability in the lumen can be improved by bringing the inner surface of the hollow fiber membrane into contact with the coating solution and then causing the fluid to flow through the lumen of the hollow fiber membrane.

When Examples 1 and 4 are compared with Examples 2 and 3, it is understood that the blood plasma leakage resistance can be improved by increasing the concentration of polydimethylsiloxane in the coating solution.

What is claimed is:

1. A method for manufacturing an oxygenator having a plurality of porous hollow fiber membranes for gas exchange, comprising the steps of:
    dissolving a silicone compound in an organic solvent having a surface tension of less than 70 dyn/cm to prepare a coating solution; and
    bringing an inner surface of the hollow fiber membranes into contact with the coating solution while bringing an outer surface of the hollow fiber membranes into contact with water to form a coating layer containing a silicone compound on the inner surface.

2. The method according to claim 1, wherein
    after bringing the inner surface of the hollow fiber membranes into contact with the coating solution, a fluid is caused to flow through a lumen of the hollow fiber membranes to remove the coating solution.

3. The method according to claim 2, wherein
    the fluid is selected from the group consisting of air, an inert gas, water, and a lower alcohol.

4. The method according to claim 1, wherein a concentration of the silicone compound in the coating solution is more than 400 mg/mL and less than 800 mg/mL.

5. The method according to claim 1, wherein the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent.

6. The method according to claim 1, wherein at least a part of the hollow fiber membranes are formed of polypropylene or polymethylpentene.

7. The method according to claim 1, further comprising the step of:
    forming a coat containing an antithrombotic polymer compound on the outer surface of the hollow fiber membranes.

8. The method according to claim 1, wherein the silicone compound is represented by the following Formula (1):

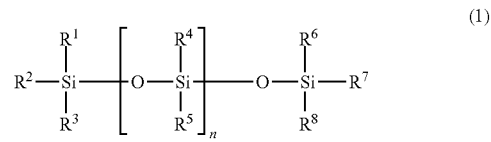

(1)

and wherein in the above Formula (1), $R^1$ to $R^8$ each independently represent an alkyl group having 1 or more and 6 or less carbon atoms, an aromatic hydrocarbon group having 6 or more and 30 or less carbon atoms, or a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group; and n is 1 or more and 100,000 or less.

9. A method for manufacturing an oxygenator having a plurality of porous hollow fiber membranes for gas exchange, comprising the steps of:
fixing ends of the hollow fiber membranes to partition walls at opposing ends of a housing such that the ends of the hollow fiber membranes are open, wherein the housing defines a gas chamber inside the hollow fiber membranes and a blood chamber outside the hollow fiber membranes;
dissolving a silicone compound in an organic solvent to prepare a coating solution;
filling the blood chamber with water to bring outer surfaces of the hollow fiber membranes into contact with the water;
filling the gas chamber with the coating solution to bring inner surfaces of the hollow fiber membranes into contact with the coating solution while the water contacts the outer surfaces to form a coating layer containing a silicone compound on the inner surfaces;
removing the coating solution from the gas chamber; and
removing the water from the blood chamber.

10. The method according to claim 9, wherein the coating solution is removed by flowing a fluid through the hollow fiber membranes, and wherein the method further comprising the step of:
drying the hollow fiber membranes.

11. The method according to claim 10, wherein the fluid is selected from the group consisting of air, an inert gas, water, and a lower alcohol.

12. The method according to claim 9, wherein a concentration of the silicone compound in the coating solution is more than 400 mg/mL and less than 800 mg/mL.

13. The method according to claim 9, wherein the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent.

14. The method according to claim 9, wherein at least a part of the hollow fiber membranes are formed of polypropylene or polymethylpentene.

15. The method according to claim 9, further comprising the step of:
forming a coat containing an antithrombotic polymer compound on the outer surface of the hollow fiber membranes.

16. The method according to claim 9, wherein the silicone compound is represented by the following Formula (1):

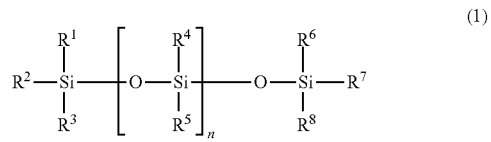

and wherein in the above Formula (1), $R^1$ to $R^8$ each independently represent an alkyl group having 1 or more and 6 or less carbon atoms, an aromatic hydrocarbon group having 6 or more and 30 or less carbon atoms, or a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group; and n is 1 or more and 100,000 or less.

* * * * *